(12) United States Patent
Erismis et al.

(10) Patent No.: US 7,919,901 B2
(45) Date of Patent: Apr. 5, 2011

(54) LOW-VOLTAGE, LARGE DISPLACEMENT STEPPING ACTUATOR AND METHOD FOR FABRICATING THE SAME

(75) Inventors: Mehmet Akif Erismis, Diest (BE); Hercules Pereira Neves, Hamme-Mille (BE); Chris Van Hoof, Leuven (BE); Robert Puers, Blanden (BE)

(73) Assignees: IMEC, Leuven (BE); Katholieke Universiteit Leuven, K.U. Leuven R&D, Leuven (BE)

( * ) Notice: Subject to any disclaimer, the term of this patent is extended or adjusted under 35 U.S.C. 154(b) by 323 days.

(21) Appl. No.: 12/172,323

(22) Filed: Jul. 14, 2008

(65) Prior Publication Data
US 2009/0019847 A1    Jan. 22, 2009

Related U.S. Application Data

(60) Provisional application No. 60/950,146, filed on Jul. 17, 2007.

(30) Foreign Application Priority Data

Jul. 16, 2007  (EP) ..................................... 07013866
May 26, 2008  (EP) ..................................... 08156898

(51) Int. Cl.
*H02N 1/00* (2006.01)
(52) U.S. Cl. ........................................ 310/306; 310/309
(58) Field of Classification Search .................. 310/300, 310/303, 306, 309; 60/527
See application file for complete search history.

(56) References Cited

U.S. PATENT DOCUMENTS

| | | | |
|---|---|---|---|
| 6,400,655 B1 | 6/2002 | Kim | |
| 6,675,578 B1 * | 1/2004 | Sinclair | 60/528 |
| 2004/0074234 A1 * | 4/2004 | Howell et al. | 60/527 |
| 2004/0263028 A1 * | 12/2004 | Pei et al. | 310/800 |
| 2005/0016605 A1 | 1/2005 | Sherman et al. | |
| 2005/0211313 A1 | 9/2005 | Sherman et al. | |
| 2006/0261702 A1 * | 11/2006 | Harada et al. | 310/309 |
| 2007/0228868 A1 * | 10/2007 | Park et al. | 310/300 |
| 2009/0019847 A1 * | 1/2009 | Erismis et al. | 60/527 |

FOREIGN PATENT DOCUMENTS

JP          05344753    * 12/1993

OTHER PUBLICATIONS

Erismis et al., "A low-voltage large displacement larger force inchworm actuator", Journal of Micromechanical Systems, vol. 17, No. 6, Dec. 2008.*

Yeh et al., "single mask, large force, and large displacement electrostatic linear inchworm motors" Journal of Microelectromechanical systems, vol. 11, No. 4, Aug. 2002.*

(Continued)

*Primary Examiner* — Karl I Tamai
(74) *Attorney, Agent, or Firm* — McDonnell Boehnen Hulbert & Berghoff LLP

(57) ABSTRACT

The current invention provides a stepping actuator, achieving large range up to ±35 μm with low operating voltages of 15V or lower and large output forces of up to ±110 μN. The actuator has an in-plane-angular deflection conversion which allows achieving step sizes varying from few nanometers to few micrometers with a minor change in the design. According to certain embodiments of the invention, the stepping actuator comprises a geometrical structure with a displacement magnification ratio of between 0.15 and 2 at operating voltages of 15V or lower. The present invention also provides a method for forming such stepping actuators.

24 Claims, 12 Drawing Sheets

OTHER PUBLICATIONS

Sarajlic, E. et al., "High performance bidirectional electrostatic inchworm motor fabricated by trench isolation technology", IEEE 13th International Conference on Solid-State Sensors, Actuators and Microsystems, Jun. 5-9, 2005, Korea, 53-56.

De Boer, M. P. et al., "High-Performance Surface-Micromachined Inchworm Actuator", Journal of Microelectromechanical Systems, 2004, 13(1), 63-74, Feb. 2004.

Tas, N. et al., "The Shuffle Motor: A High Force, High Precision Linear Electrostatic Stepper Motor", IEEE International Conference on Solid-State Sensors and Actuators, Jun. 16-19, 1997, Chicago, 777-780.

Gianchandani, Y. B. et al., "Bent-Beam Strain Sensors", Journal of Microelectromechanical Systems, 5(1), 1996, 52-58, Mar. 1996.

European Search Report for Application No. 08156898.2 dated Nov. 28, 2008.

* cited by examiner

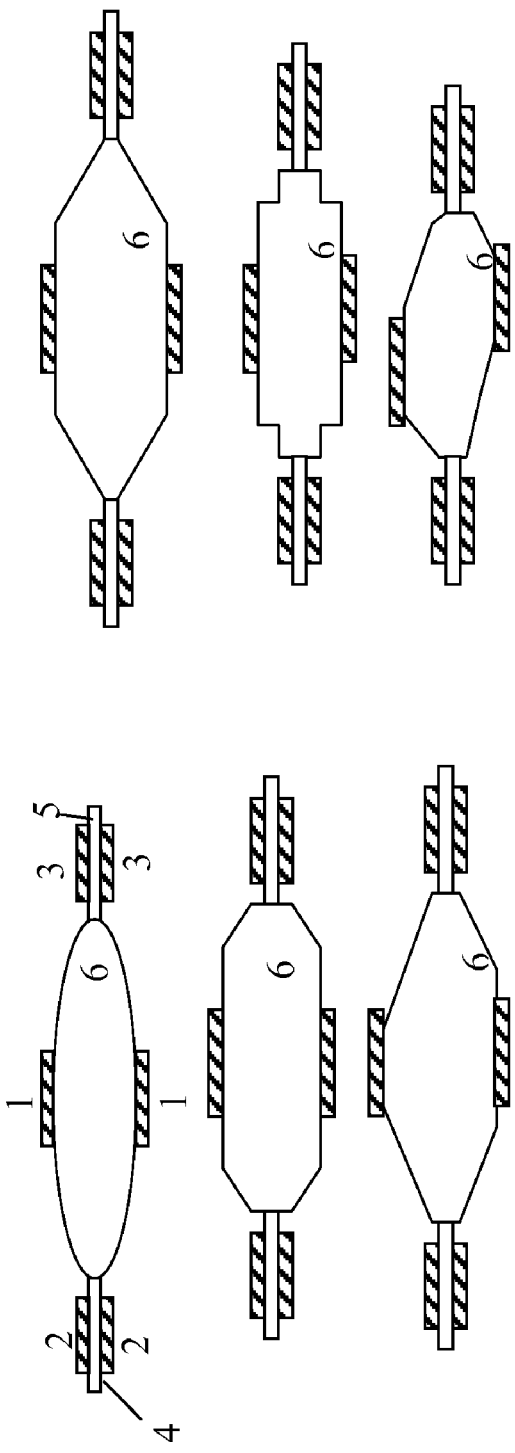
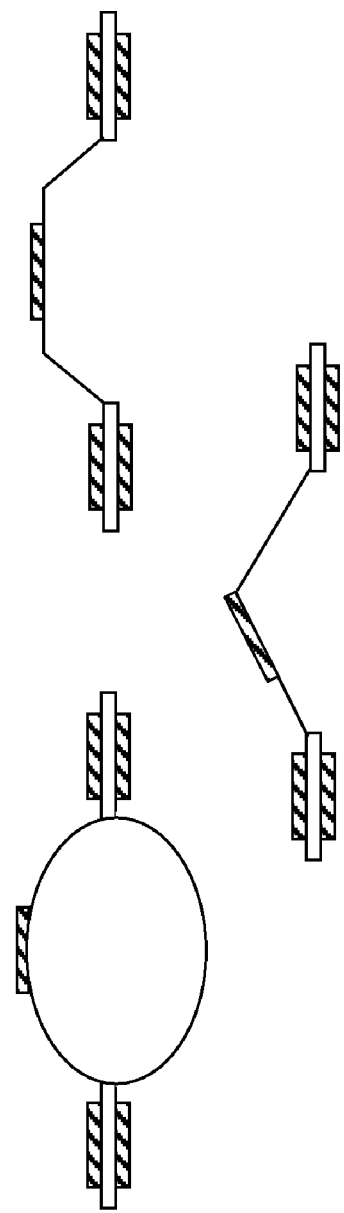
FIG. 3A
FIG. 3B (a)

(b)

US 7,919,901 B2

LOW-VOLTAGE, LARGE DISPLACEMENT STEPPING ACTUATOR AND METHOD FOR FABRICATING THE SAME

CROSS-REFERENCE TO RELATED APPLICATIONS

The present application claims priority under 35 §U.S.C. 119(e) to U.S. Provisional Patent Application Ser. No. 60/950,146, filed Jul. 17, 2007; and under 35 U.S.C. §119(a)-(d) to European Patent Applications EP 07013866.6, filed Jul. 16, 2007, and EP 08156898.2, filed May 26, 2008, each of which is hereby incorporated herein by reference in its entirety.

BACKGROUND OF THE INVENTION

1. Field of the Invention

The invention relates to stepping actuators and to methods for the formation of such stepping actuators. The stepping actuators according to certain embodiments of the present invention may be operated at voltages of 15V or lower.

2. Technical Background

Actuators are mechanical devices for moving or controlling a mechanism or system. They are devices which transform an input signal (mainly an electrical input signal) into motion. Specific examples are electrical motors, pneumatic actuators, hydraulic pistons, relays, piezoelectric actuators, digital micromirror devices (DMD) and electroactive polymers.

Linear actuators are devices used to generate controlled physical linear displacement. Linear stepping actuators can provide long-range motion with relatively high force. Movements or displacements can be obtained using a variety of mechanisms such as electrostatic force, piezoelectric deformation and elastic deformation.

Transforming an out-of-plane movement to an in-plane movement was reported by E. Sarajlic et al. (IEEE 13th Intl. Conf. on Solid-State Sensors, Actuators and Microsystems, Korea Jun. 5-9, 2005, p 53-56), M. P. de Boer et al. (J. of Micromech. Syst. 13, 63-74, 2004), and N. Tas et al. (IEEE Intl. Conf. on Solid-State Sensors and Actuators, Chicago Jun. 16-19, 1997, p 777-780).

One type of linear actuator is a MEMS actuator, which are popular in micro-positioning applications for their long ranges. MEMS actuators are especially useful in several large range micro-positioning applications such as data storage, micro-robots, microsurgery and micro-needle position. Stepping actuators are good candidates for these applications because they can provide very large ranges with their latch-drive topology, e.g. more than 20 μm, for example up to 35 μm, or even up to 1 mm.

However, until now such stepping actuators could not be considered for in vivo biomedical applications because of their required high input voltages.

Shuffle motors are also promising for their ability to achieve large positioning ranges. This is realized by the pull-in based operation and toothless latching. However, currently available shuffle motors still use relatively high operating voltages (40 V or more). This may be caused by the out-of-plane behavior of these motors: out-of-plane deflection is converted to in-plane deflection and this step deflection is maintained with friction forces. These high voltages still make them unsuitable for being used for in vivo applications.

To achieve low voltage operation, the shuffle motor can be built with a thin (thickness lower than 3 μm) out-of-plane deflecting plate and/or a large capacitance electrode. However, both solutions will cause problems such as, for example, buckling of the actuator.

SUMMARY OF THE INVENTION

In a first aspect of the invention a stepping actuator is provided. The stepping actuator comprises:
 a movable body comprising a geometrical structure having attached at opposite sides thereto a first shuttle arm having a first longitudinal direction and a second shuttle arm having a second longitudinal direction,
 at least one drive actuator co-operative with the geometrical structure to drive the stepping actuator, and
 at least two latch actuators operative to latch the stepping actuator, a first of the latch actuators being co-operative with the first shuttle arm and a second of the latch actuators being co-operative with the second shuttle arm,
wherein the geometrical structure has a displacement magnification ratio of between 0.15 and 2 at operating voltages of 15V or lower, the displacement magnification ratio being defined as the ratio of a displacement of the movable body in a first direction substantially parallel to the longitudinal direction of the first shuttle arm to a deformation of the geometrical structure causing the displacement of the movable body and being directed in a second direction substantially perpendicular to the first direction.

An advantage of the stepping actuator according to certain embodiments of the invention is that it only requires a low voltage in the range of 15V or lower for generating large displacements of up to 35 μm and large output forces of up to ±110 μN.

Because of the low voltages required for the stepping actuator according to certain embodiments of the invention to work, it can be used for large range micro-positioning applications such as data storage, micro-robots, and for in-vivo applications such as e.g. in cochlear implants, as drivers for artificial muscles, for microsurgery, for micro-needle positioning, or for microprobe depth control.

According to certain embodiments of the invention, the geometrical structure may comprise:
 at least two drive springs between the shuttle arms and the at least one drive actuator, and
 at least three rigid parts at the location of the two shuttle arms and the drive actuator, and wherein the total length of the drive springs in the first direction is larger than the total height of the drive springs in the second direction.

According to certain embodiments of the present invention, the geometrical structure may be a hexagonal structure. The displacement magnification ratio of the hexagonal structure may be defined as $\Delta x/\Delta y = 2 \tan \theta$, wherein $\Delta x$ is the displacement of the movable body in the first direction, $\Delta y$ the deformation of the geometrical structure (6) in the second direction and wherein $\Delta$ is defined as the angle between an imaginary line in the longitudinal direction of the first shuttle arm extending from the first shuttle arm in a sense away from a free extremity thereof, and a drive spring of the geometrical structure, the drive spring being attached to the first shuttle arm. According to certain embodiments of the invention, $\theta$ may be between 5° and 45°, preferably between 7° and 20°.

According to certain embodiments of the invention, the drive actuator may comprise at least one drive shuttle part.

According to other embodiments of the invention, the drive actuator may comprise a plurality of drive shuttle parts of which at least two are located at opposite sides of the geometrical structure.

According to certain embodiments of the invention, the at least two latch actuators may each comprise at least one latch.

According to other embodiments of the invention, the at least two latch actuator may each comprise a plurality of latches of which at least two are located at substantially opposite sides of the first or second shuttle arm.

In certain embodiments of the invention, the at least one drive shuttle part may be attached to the geometrical structure.

In certain embodiments of the invention, at least one of the at least two latch actuators may be operative to latch the first shuttle arm upon applying a first latch voltage and at least one of the at least two latch actuators may be operative to latch the second shuttle arm upon applying a second latch voltage.

According to certain embodiments of the invention, the geometrical structure may be an elastic structure.

In a second aspect, the present invention provides a method for forming a stepping actuator. The method comprises:

providing a movable body comprising a geometrical structure having attached at opposite sides thereto a first shuttle arm having a first longitudinal direction and a second shuttle arm having a second longitudinal direction, providing at least one drive actuator co-operative with the geometrical structure to drive the stepping actuator, and providing at least two latch actuators operative to latch the stepping actuator, a first of the latch actuators being co-operative with the first shuttle arm and a second of the latch actuators being co-operative with the second shuttle arm, wherein the geometrical structure has a displacement magnification ratio of between 0.15 and 2 at operating voltages of 15V or lower, the displacement magnification ratio being defined as the ratio of a displacement of the movable body in a first direction substantially parallel to the longitudinal direction of the first shuttle arm to a deformation of the geometrical structure causing the displacement of the movable body and being directed in a second direction substantially perpendicular to the first direction.

According to certain embodiments of the invention, providing a geometrical structure may be performed by providing at least two drive springs between the shuttle arms and the at least one drive actuator such that the geometrical structure comprises at least three rigid parts at the location of the two shuttle arms and the at least one drive actuator and such that the total length of the drive springs in the first direction is larger than the total height of the drive springs in the second direction.

According to certain embodiments of the invention, providing a geometrical structure may be such that the geometrical structure is a hexagonal structure. The displacement magnification ratio of the hexagonal structure may be defined as $\Delta x / \Delta y = 2 \tan \theta$, wherein $\Delta x$ is the displacement of the movable body in the first direction, $\Delta y$ the deformation of the geometrical structure (6) in the second direction and wherein $\Delta$ is defined as the angle between an imaginary line in the longitudinal direction of the first shuttle arm extending from the first shuttle arm in a sense away from a free extremity thereof, and a drive spring of the geometrical structure, the drive spring being attached to the first shuttle arm. Providing a geometrical structure may be such that $\theta$ is between 50 and 45°, preferably between 7° and 20°.

According to certain embodiments of the invention, providing at least one drive actuator may comprise providing at least one drive actuator comprising at least one drive shuttle part.

According to certain embodiments of the invention, providing at least two latch actuators may comprise providing at least two latch actuators each comprising at least one latch.

According to certain embodiments of the invention, providing at least one drive actuator may be performed by attaching at least one drive shuttle part to the geometrical structure.

According to certain embodiments of the invention, the geometrical structure, the first and second shuttle arms and the drive and latch actuators may be provided by using Silicon on Insulator Multi User MEMS Processes.

The present invention also provides a controller for a stepping actuator that has a movable body comprising a geometrical structure having attached at opposite sides thereto a first shuttle arm having a first longitudinal direction and a second shuttle arm having a second longitudinal direction, at least one drive actuator co-operative with the geometrical structure to drive the stepping actuator, and at least two latch actuators for latching the stepping actuator, a first of the latch actuators being co-operative with the first shuttle arm and a second of the latch actuators being co-operative with the second shuttle arm, the controller being adapted to control the at least one drive actuator and the at least two latch actuators such that the geometrical structure has a displacement magnification ratio of between 0.15 and 2, preferably between 0.2 and 0.75 at operating voltages of 15V or lower, preferably lower than 10V.

It is an advantage of the stepping actuator according to certain embodiments of the invention that it only requires a low voltage in the range of 15V or lower for generating large displacements of up to 35 μm and large output forces of up to ±110 μN.

The stepping actuator according to certain embodiments of the invention can be used for several large range micro-positioning applications such as data storage, micro-robots, microsurgery and micro-needle position.

The stepping actuator according to certain embodiments of the present invention can be used for in vivo biomedical applications.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 3A to FIG. 3F illustrate different shapes of the geometrical structure of stepping actuators according to certain embodiments of the present invention.

Figure 1:
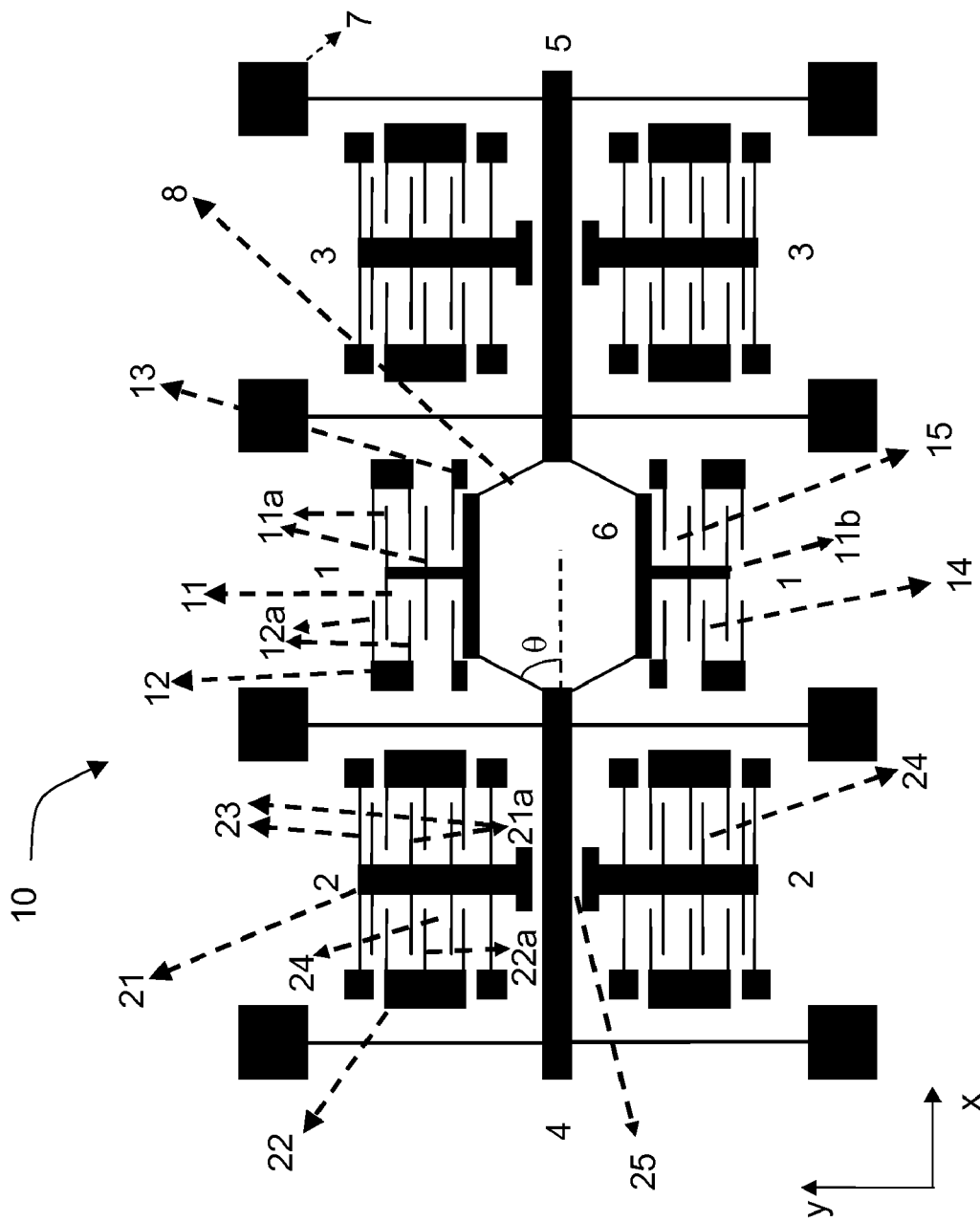
FIG. 1 schematically shows a stepping actuator according to one embodiment of the invention.

In the different figures, the same reference signs refer to the same or analogous elements.

DETAILED DESCRIPTION OF THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order or limiting the numbers of elements so identified. The terms are interchangeable under appropriate circumstances and the embodiments of the invention can operate in other sequences than described or illustrated herein.

The term "comprising", used in the claims, should not be interpreted as being restricted to the elements and steps listed thereafter; it does not exclude other elements or steps. It should be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B. Rather, it means that the device includes both A and B, optionally in combination with other elements.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

In certain embodiments, the present invention provides a stepping actuator which can be operated at a limited voltage of 15 V or lower for generating large displacements of up to 35 μm and large output forces of up to ±110 μN and a method for manufacturing such a stepping actuator.

The stepping actuator comprises:
- a movable body comprising a geometrical structure having attached at opposite sides thereto a first shuttle arm having a first longitudinal direction and a second shuttle arm having a second longitudinal direction,
- at least one drive actuator co-operative with the geometrical structure to drive the stepping actuator, and
- at least two latch actuators operative to latch the stepping actuator, a first of the latch actuators being co-operative with the first shuttle arm and a second of the latch actuators being co-operative with the second shuttle arm.

According to certain embodiments of the present invention, the geometrical structure has a displacement magnification ratio of between 0.15 and 2 at operating voltages of 15V or lower, the displacement magnification ratio being defined as the ratio of a displacement of the movable body in a first direction substantially parallel to the longitudinal direction of the first shuttle arm to a deformation of the geometrical structure causing the displacement of the movable body and being directed in a second direction substantially perpendicular to the first direction.

According to certain embodiments of the present invention low voltage (15 Volts or lower), large range (up to 35 μm), and large force (up to ±110 μN) stepping actuators may be obtained. Because of the requirement of only low voltages, the stepping actuator according to certain embodiments of the invention can be used for in vivo applications, such as e.g. in cochlear implants, drivers for artificial muscles, or microprobe depth control.

According to certain embodiments of the invention, the geometrical structure may comprise:
 at least two drive springs between the shuttle arms and the at least one drive actuator, and
 at least three rigid parts at the location of the two shuttle arms and the drive actuator,
wherein the total length of the drive springs in the first direction is larger than the total height of the drive springs in the second direction.

According to certain embodiments of the invention, the at least one drive actuator and at least two latch actuators may be pull-in actuators. According to these embodiments, the stepping actuator may be a pull-in based actuator and may be based on a pull-in based operation and toothless latching to achieve low operating voltages of 15V or lower with large forces. By "pull-in based actuator" is meant that an electrostatic pull-in phenomenon is used to actuate each moving block or each pull-in actuator of the actuator. The pull-in phenomenon is a phenomenon of collapsing of moving and stationary fingers or arms due to electrostatic forces. By "pull-in voltage" is meant the minimum voltage needed to achieve the pull-in phenomenon, i.e. to achieve collapsing of moving and stationary fingers due to electrostatic forces. A shuffle motor is an example of a pull-in based stepping actuator which uses out-of-plane topology.

Alternatively, the at least one drive actuator and at least two latch actuators may be push actuators.

Low operation voltages may be achieved because the actuator according to certain embodiments of the invention operates in-plane, i.e. the actuator according to certain embodiments of the invention uses in-plane angular deflection conversion (see further), in contrast to the out-of-plane deflection conversion which is characteristic for actuators, e.g. shuffle motors, according to the prior art. The actuator according to certain embodiments of the invention has an in-plane-angular deflection conversion and allows setting step sizes varying from few nanometers to few micrometers with a minor change in the design. This can lead to three main advantages. First, fabrication can be simpler and cheaper. An SOI based MUMPs (Multi User MEMS Process) can be used (see below). Second, large capacitances of ~1 pF, large forces of up to ±110 μN and low voltages of 15V or lower can be achieved with minimum buckling problems with comb finger topologies (see below). Third, the displacement magnification ratio can be altered within a large range in the design, thus providing step deflection of the actuator ranging from a few nanometers to a few micrometers (see below). Consequently a range of actuators with different step sizes for different purposes can be achieved.

When in the following description the terms "stepping actuator," "stepwise actuator," "stepper" or "stepping motor," or "microactuator" are used, the same thing is meant, i.e. an actuator whereby movements are achieved step-by-step. According to certain embodiments of the present invention, movements are realized by electrostatic forces, not by piezoelectric effect as is the case for, for example, an inchworm actuator.

In the following description, the term "elastic" or "elastic structure" means that a displacement in a first direction occurs as a result of a deformation, e.g. compression or extension, of the structure in a second direction different from the first direction. When the shape in the second direction is restored, the shape in the other direction is also restored. So the shape of the structure can be completely restored.

Furthermore, by "angular deflection conversion" is meant that a step deformation in a second direction is converted into a step displacement in first direction different from the second direction with a conversion ratio related to the angle $\theta$ between an imaginary line in the longitudinal direction of the first shuttle arm, extending from shuttle arm in a sense away from a free extremity thereof, and a drive spring 8 which forms part of the geometrical structure, e.g. hexagonal structure, and is attached to shuttle arm. The angle $\theta$ is also referred to as bent-beam angle.

Figure 2A:
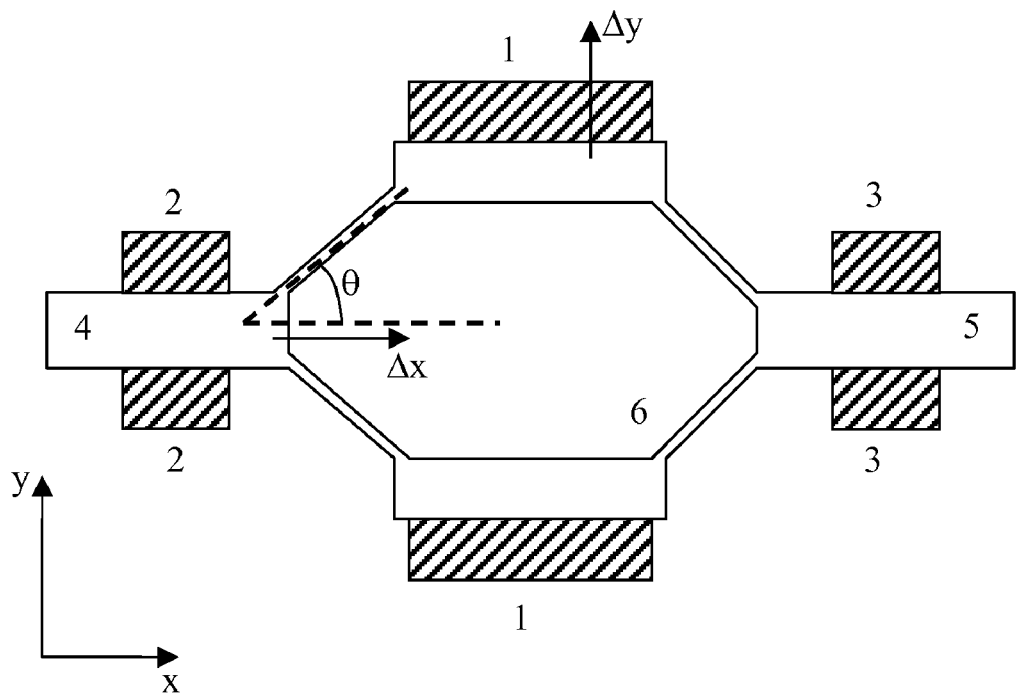
FIG. 2(a) and FIG. 2(b) illustrate different shapes of the geometrical structure of stepping actuators according to certain embodiments of the present invention.

By "geometrical structure" is meant a structure which in a cross-section through the drive springs and parallel to the longitudinal direction of the shuttle arms is formed of at least one curved line or of at least two straight lines. In certain embodiments of the present invention, the cross-section may be parallel to a surface of a substrate on which the stepping actuator is made. According to certain embodiments of the invention, the structure my have an open (see for example FIGS. 3B and 12) or closed configuration (examples are given in FIGS. 2 and 3A). According to certain embodiments of the invention, the geometrical structure can comprise a plurality of straight lines in a closed configuration so as to form a polygon, e.g. a square, a hexagon. According to other embodiments of the invention, the geometrical structure may comprise two curved lines in a closed configuration so as to form a circle or an oval.

By "shuttle" or "shuttle arm" is meant the movable part of the actuator where the resultant displacement is achieved. A latch or clamp actuator and a drive actuator are moving blocks of the actuator which are used for gripping and/or fixing of the shuttles and for creating step-displacement, respectively. A truss is the movable part of the drive actuator to which comb fingers or arms are attached.

The actuator according to certain embodiments of the invention has an in-plane angular deflection conversion which provides a force-displacement trade-off. The in-plane-angular deflection conversion creates a step displacement, i.e. a deformation of the geometrical structure in a second direction results in a step displacement of a shuttle arm in a first direction. Force-displacement trade-off relates to this step displacement and to the force on a shuttle arm created during this step displacement. In case of a small angle $\theta$, if the step displacement is small, the force ("pushing force") on the shuttle arm created during this step displacement will be high. In this case, a high latch voltage will be required to prevent slipping of the shuttle arm (see further). In case of a large angle $\theta$, if the step displacement is large, then the force created on the shuttle arm during this displacement will be small. In this case, a small latch voltage may be sufficient to prevent slipping of the shuttle arm (see further). The step displacement, and thus also the force acting on the shuttle arm is determined by the angle $\theta$. Either the step displacement or the force on the shuttle arm can be small, not both at the same time.

FIG. 1 shows a schematic representation of a microactuator or stepping actuator 10 according to an embodiment of the present invention. The microactuator 10 according to the present embodiment comprises a movable body 4, 5, 6 and three actuators 1, 2, 3, for example of the pull-in type, of which one is used for driving, i.e. drive actuator 1, and two are used for latching, i.e. latch actuators 2, 3. The movable body comprises a geometrical structure 6 with attached thereto at substantially opposite sides thereof a first and second shuttle arm 4, 5. According to certain embodiments of the invention, the movable body may comprise an open or a closed geometrical structure 6.

The drive actuator 1, also referred to as driver 1, may comprise two parts co-operative with the geometrical structure 6 and provided at opposite sides thereof, as illustrated in the drawings, e.g. in FIG. 1. The drive actuator 1 may combine two drive shuttle parts or drive shuttles 11 having comb fingers or arms 11a. The driver 1 in accordance with certain embodiments of the present invention provides in-plane angular deflection conversion of the geometrical structure 6, e.g. a closed configuration of lines forming a hexagon, also referred to as hexagonal structure. The force, e.g. pull-in force, on the drive shuttles 11 is realized by drive electrodes 12 having comb fingers or arms 12a onto which a voltage called the drive voltage is applied. The comb fingers or arms 11a of the drive shuttles 11 and the comb fingers or arms 12a of the drive electrodes 12 are interposed, there being a gap or distance in between the comb fingers or arms 11a of the drive shuttles 11 and the comb fingers or arms 12a of the drive electrodes 12. This gap is called the drive gap 14. The movement of the drive shuttles 11 is stopped by the drive stop electrode 13. The gap or distance between the drive stop electrode 13 and the comb finger or arm 11a of the drive shuttle 11 closest to the drive stop electrode 13 is called the drive-stopper gap 15.

In the example of FIG. 1, the movable body 4, 5, 6 comprises a hexagonal structure as geometrical structure 6. However, according to certain embodiments of the invention, the geometrical structure 6 may have any suitable shape as will be explained further in this description. By applying a drive voltage to a drive shuttle 11, the drive shuttle 11 is moved and causes a deformation of the geometrical structure 6, in the example given the hexagonal structure 6. The deformation of the geometrical structure 6 may be in a direction substantially perpendicular to the longitudinal direction of shuttle arm 4, in the example given in the y direction (indicated by the co-ordinate system as shown in FIG. 1). This deformation of the geometrical structure 6 results in a displacement of the whole movable body 4, 5, 6 in a direction substantially parallel to the longitudinal direction of shuttle arm 4, also referred to as moving direction and in the example given the x direction (indicated by the co-ordinate system in FIG. 1). By "the displacement of the whole movable body in a first direction" is meant the displacement of the movable body during one operation cycle (see below).

Both the deformation in the y direction and the displacement in the x direction can occur in the same plane. According to certain embodiments of the invention, none, one or both of the deformation in the y direction and the displacement in the x direction may occur, when the actuator 10 is formed on a substrate lying in a plane, in a direction substantially parallel to the plane of the substrate.

The deformation of the geometrical structure 6 is also referred to as bent-beam deflection. The deformation can be realized by a first and second drive shuttle 11 at substantially opposite sides of the geometrical structure, in the example of FIG. 1 the hexagonal structure 6. According to certain embodiments of the invention, an imaginary line connecting the two drive shuttles 11 may be substantially perpendicular to the moving direction, i.e. to the x direction. According to other embodiments of the invention, this imaginary line may make an angle with the moving direction, in the example given the x direction, of less than 90°, for example an angle between 30° and 90°, between 40° and 90°, between 45° and 90°, or between 60° and 90°.

The actuator 10 according to the example of FIG. 1 is associated with two drive shuttle parts or drive shuttles 11. According to other embodiments, the deformation can also be realized by only one shuttle 11. Two examples of a design of a stepping actuator 10 comprising one shuttle 11 are given in FIGS. 12 (a) and (b). However, preferably at least two drive shuttles 11 are used at opposite sides of the geometrical structure 6, as illustrated in the present embodiment. Furthermore, deformation of the geometrical structure 6 may also be realised by more than two drive shuttles 11. For stability reasons, preferably at least two of the drive shuttles 11 are at opposite sides of the geometrical structure 6, and whereby an imaginary line connecting these two drive shuttles 11 at opposite sides of the geometrical structure 6 is substantially perpendicular to the moving direction, in the present example the x direction. For example, the actuator 10 may comprise four drive shuttles 11, two at each side of the geometrical structure 6, in the example given hexagonal structure. According to other embodiments, the actuator 10 may also comprise three drive shuttles 11 of which one is located at one side of the geometrical structure 6 and the two others are located at the other side of the geometrical structure 6. The drive shuttles 11 should be located such that a deformation of the geometrical structure 6 is realized in a direction substantially perpendicular to the moving direction.

The actuator 10 according to the embodiment illustrated in FIG. 1 can furthermore comprise a first and second latch actuator 2, 3, e.g. of the pull-in type. These latch actuators 2, 3 comprising latches 21 and latch electrodes 22 are located along corresponding shuttle arms 4, 5 of the movable body 4, 5, 6 to fix the shuttle arms 4, 5 during the latching cycle by grabbing them. The latch actuators 2, 3 may each comprise two parts, i.e. two latches 21, co-operative with arms 4 and 5 and provided at opposite sides thereof, as illustrated in the drawings, e.g. in FIG. 1. The force, e.g. pull-in force, on the latches 21 is realized by applying a voltage, referred to as latch voltage, to the latch electrodes 22. The latches 21 comprise comb fingers or arms 21a. The latch electrodes 22 comprise arms 22a. These arms 22a are interposed with the arms 21a provided on the latches 21. A gap or distance exists between the arms 21a of the latches 21 and the arms 22a of the latch electrodes 22. This gap is called the latch gap 24. Stopping of the latches 21 is obtained by hitting against the corresponding shuttle arms 4 and 5. The gap or distance between the latch 21 and the shuttle arm 4 or 5 is called latch-stopper gap 25. Furthermore, latch springs 23 are provided. These latch springs 23 have a latch stiffness influencing the movement of the latches 21 provided by application of the latch voltage on the latch electrodes 22. Latching of a shuttle arm 4, 5 can be realized by two latches 21 at substantially opposite sides of each of the shuttle arm 4, 5. According to certain embodiments of the invention, location of the two latches 21 may be such that an imaginary line connecting the two latches 21 is oriented in a direction substantially perpendicular to the moving direction, in the example given the x direction. According to other embodiments of the present invention, this imaginary line may make an angle with the moving direction, in the example given the x direction, of less than 90°, for example an angle between 60° and 90°, between 70° and 90°, or between 80° and 90°.

In the example given in FIG. 1, latching of a shuttle arm 4, 5 is realized by latch actuators 2, 3 each comprising two parts, i.e. two latches 21. It has to be noted that latching may also be realized by more than two latches 21, of which at least two are at opposite sides of each of the shuttle arms 4, 5 and an imaginary line connecting these two latches 21 may be substantially perpendicular to the moving direction, in the example given the x direction. For example, the actuator 10 may comprise four latches 21, two at each side of the shuttle arm 4 or 5. According to other embodiments of the invention, the actuator 10 may also comprise three latches 21, one at one side of the shuttle arm 4 or 5 and two at the other side of the shuttle arm 4 or 5. The latches 21 should be located such that latching of the shuttle arm 4 or 5 is realized with a relatively low applied voltage of 15V or lower, preferably 10V or lower.

Operation of the actuator 10 may be obtained by applying voltages to the drive and latch actuators 1, 2, 3, i.e. a drive voltage is applied to the drive electrodes 12 of drive actuator 1 and a latch voltage is applied to the latch electrodes 22 of the latch actuators 2, 3. The drive and latch voltages may, according to certain embodiments of the invention, be equal to each other or may, according to other embodiments, be different from each other. For example, the drive voltage may be higher than the latch voltage or the latch voltage may be higher than the drive voltage. Often the latch voltage is higher than the drive voltage. The operating voltages of the actuator 10 may be defined as all voltages to be applied to the actuator 10 for the actuator to function, i.e. the drive voltage to be applied to the at least one drive actuator 1 and the latch voltage to be applied to the latch actuators 2, 3. In certain embodiments of the present invention, the operating voltages of the actuator are not higher than 15 V, preferably not higher than 10V.

As described above, the movable body 4, 5, 6 can comprise a geometrical structure 6, in the example given in FIG. 1 a hexagonal structure, in the centre and two shuttles or shuttle arms 4, 5 at the left and the right side of this geometrical structure 6. The configuration of the movable body 4, 5, 6 may be such that an imaginary line connecting the shuttle arms 4, 5 is oriented in the moving direction, in the example of FIG. 1 in the x direction. According to other embodiments, however, this imaginary line may also make an angle with the moving direction, in the example of FIG. 1 the x direction, for example an angle of between 0° and 30°, between 0° and 20°, between 0° and 10°, or between 0° and 5°. The movable body 4, 5, 6 is attached to a substrate via the shuttle arms 4, 5 using loads or load springs 7. The stiffness of the load 7 can influence the movement of the movable body 4, 5, 6.

In the example given in FIG. 1 the geometrical structure 6 is a hexagonal structure. This is an example of a closed configuration of straight lines. However, according to other embodiments of the invention, the geometrical structure 6 may also have other geometrical shapes. The geometrical structure 6 may be substantially circular or oval (see FIG. 2) i.e. may comprise a closed configuration of two curved lines, but may also have any other suitable shape as illustrated in FIG. 3A, in which different geometries, i.e. different closed configurations of straight lines, for the geometrical structure 6 are represented. Furthermore, also open configurations of a combination of lines may be used as a geometrical structure 6 (see for example embodiments illustrated in FIG. 3B). Also FIGS. 12(*a*) and 12(*b*) show examples of stepping actuators 10 which have a geometrical structure formed of a combination of lines in an open structure. In fact all geometrical structures can be used which have characteristics, e.g., shape and stiffness, so that a deformation in a first direction substantially perpendicular to the longitudinal direction of shuttle arm 4, in the examples given in the y direction, results in a substantive displacement in a second direction substantially perpendicular to the first direction, in the examples given in the x-direction, by using low drive voltages, i.e. by using drive voltages of 15V or lower, more particularly 10V or lower, more particularly 8V or lower, or more particularly 5V or lower.

Figure 3C:
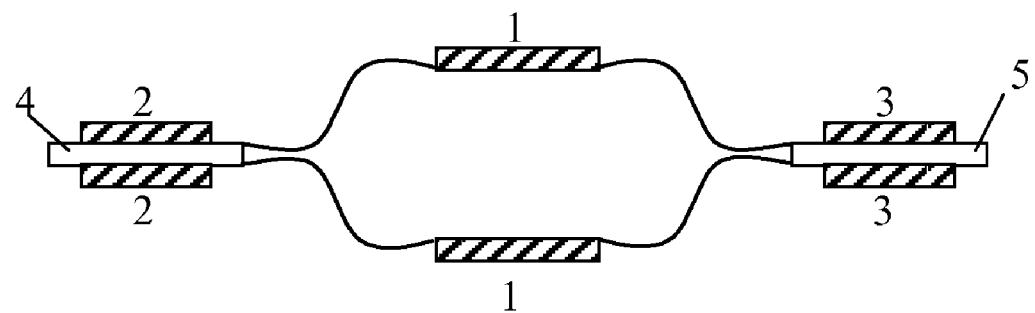
Figure 3D:
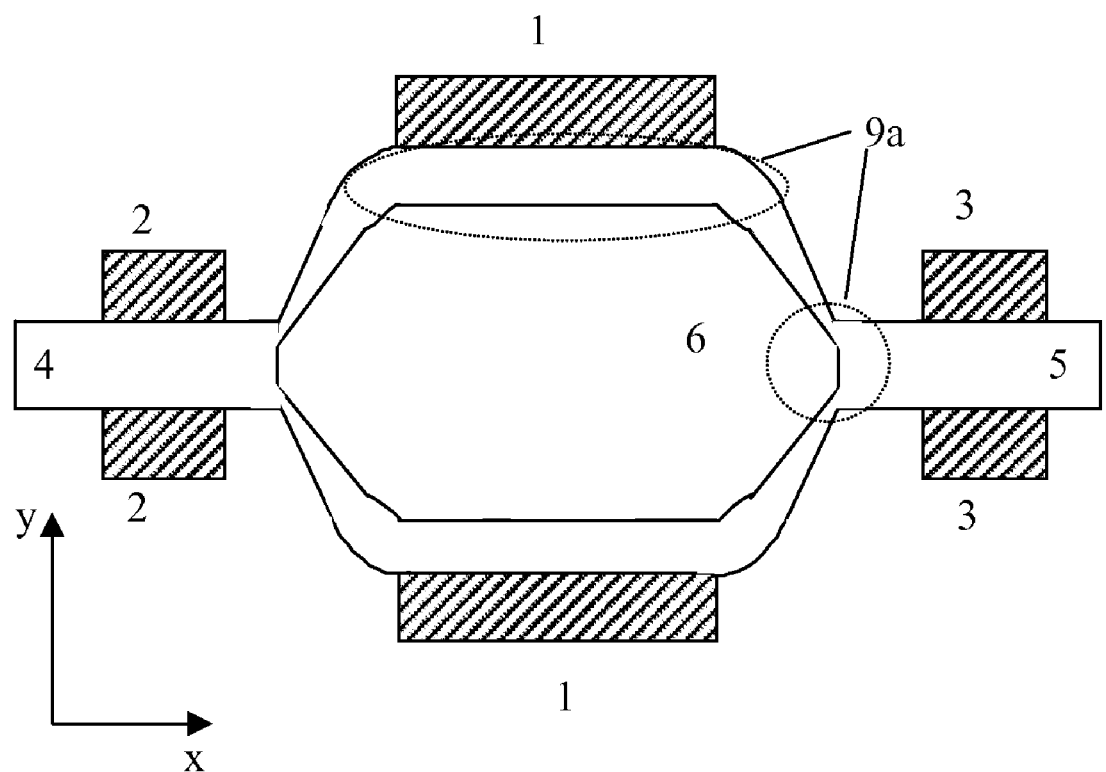

The two shuttle arms 4, 5 and the at least one drive actuator 1 represent suspended bodies. According to certain embodiments of the invention, the actuator 10 can comprise at least three suspended bodies. The case of three suspended bodies is illustrated in FIG. 3B. FIGS. 3A, 3C and 3D illustrate different examples of geometries with four suspended bodies. It should be understood, that according to certain embodiments of the invention, the actuator 10 can also comprise more than four suspended bodies. At the locations of the suspended bodies (indicated with reference number 9*a* in FIGS. 3D and 3E), the geometrical structure 6 is less deformable than the other parts of the geometrical structure 6. In the best case the geometrical structure is rigid at the locations of the suspended bodies, meaning that at these locations the geometrical structure is not deformable and/or not deformed upon driving the stepping actuator 10. According to certain embodiments of the invention, the geometrical structure 6 may thus have at least three rigid parts. Also other parts, which are indicated with reference number 9*b* in FIG. 3E, in between the (more) rigid parts 9*a*, can be, but do not need to be, (more) rigid.

Figure 3E:
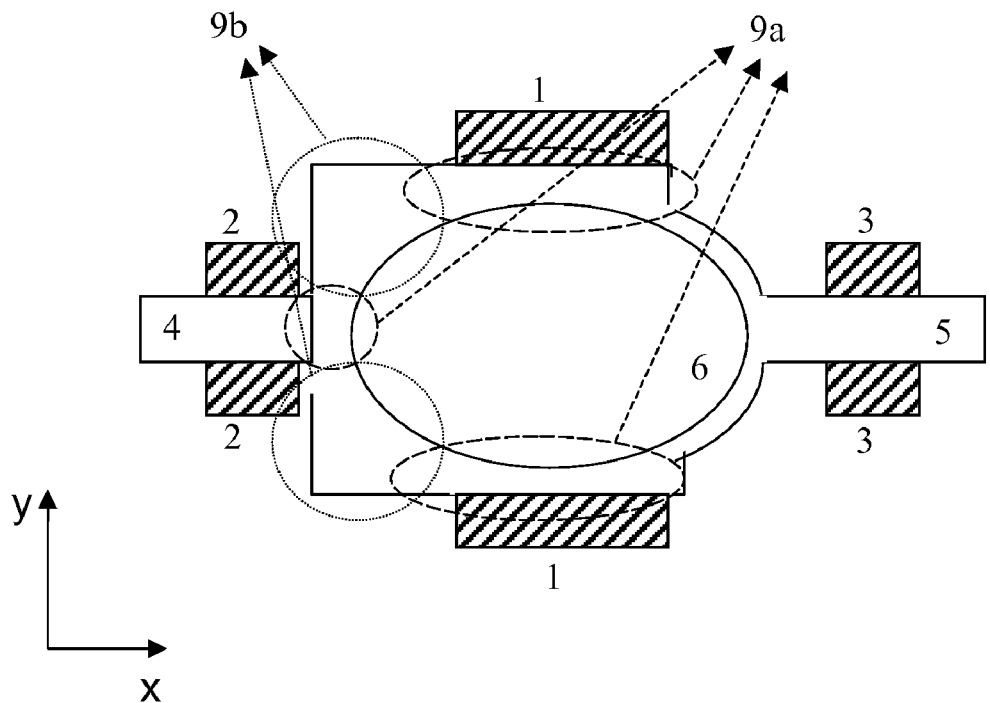
Figure 3F:
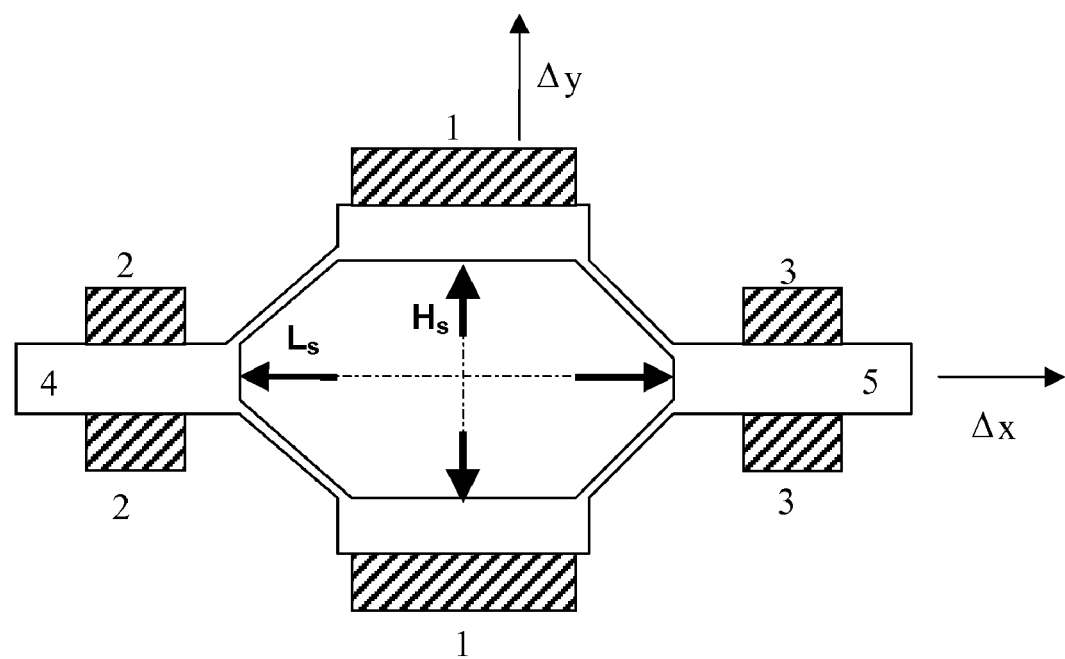

Other parts of the geometrical structure 6 may be deformable and represent the drive springs 8. There are at least 2 deformable drive springs. FIGS. 3B and 3E illustrate examples of geometrical structures 6 with two deformable drive springs. FIGS. 3A, 3C, 3D and 3F illustrate examples of geometrical structures 6 with four deformable drive springs. According to other embodiments, also other geometries with, for example three, five or more deformable springs 8 may be possible.

According to certain embodiments of the invention, the drive springs 8 may have a uniform thickness. In that case, the deformation of the springs 8 may be uniform upon driving the stepping actuator (see for example in FIG. 3A). By choosing a different geometry, the deformation can also be non-uniform (see for example FIG. 3C). According to other embodiments of the invention, the shape of the drive springs 8 may be non-uniform (as illustrated in FIG. 3D). In that case, consequently the deformation will be non-uniform. The deformation of the thinnest parts (near the shuttle arms 4, 5 in FIG. 3D) will be larger than the deformation of the thicker parts (near the driver actuators 1 in FIG. 3D).

Figure 2B:
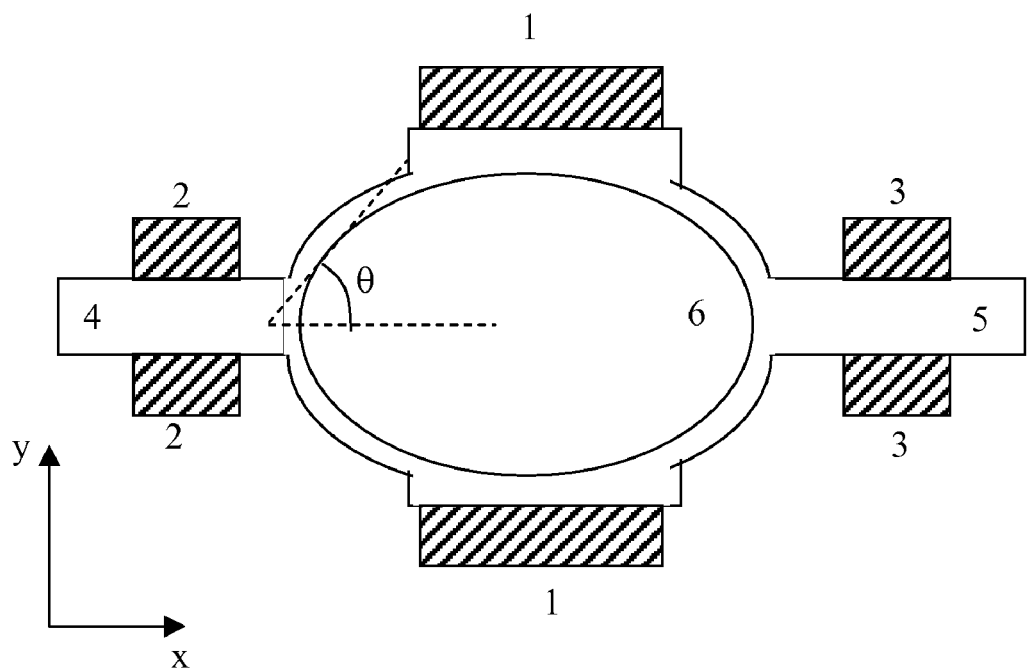

As discussed above, the geometrical structure 6 has two orthogonal longitudinal directions, called x and y (see FIGS. 1 and 2). The x-direction is the moving direction of the movable body 4, 5, 6. The y-direction is perpendicular to the x-direction. The total length $L_s$ of the drive springs 8 in the x-direction can be defined as the total length of the springs between the shuttle arms 4, 5 in the x-direction, so without the average length of the (more) rigid parts located at the at least one driver actuator 1 in the x-direction (see FIG. 3F). The total height $H_s$ of the drive springs 8 is the total height of the drive springs 8 in the y-direction between the driver actuators in case of a closed geometrical structure (see FIG. 3F) and is twice the total height of the springs in the y-direction in case of an open geometrical structure, so without the average length of the (more) rigid parts located at the shuttle arms 4, 5 in the y-direction.

When the geometry of rigid parts and drive springs 8 is well-chosen by the person of skill in the art, a displacement magnification ratio between 0.15 and 2 can be realized at operating voltages of 15V or lower. In case the geometrical structure is rigid at the locations of the suspended bodies and in case the deformation of the drive springs 8 is uniform, this displacement magnification ratio can be realized when total length $L_s$ of the springs 8 is larger than the total height $H_s$ of the drive springs 8.

It should be noted that, according to certain embodiments of the invention, the deformation of the geometrical structure 6 is in a direction substantially perpendicular to the longitudinal direction of shuttle arm 4. For example, in structures like the one in the configuration of the stepping actuator illustrated in FIG. 12(*b*), the deformation of the geometrical structure in a direction indicated by arrow 35 has an x-component 36 and a y component 37. For such geometrical structures, when reference is made to the deformation, always the y-component 37 of the maximum deformation is meant, or in other words, always the component 37 of the maximum deformation in a direction substantially perpendicular to the longitudinal direction of shuttle arm 4 is meant. In certain embodiments of the present invention, this component of the maximum deformation can be measured at a point on the drive spring 8 farthest away from the shuttle arm 4. The displacement magnification ratio for such structures may then be defined as the ratio of a displacement of the movable body in a first direction substantially parallel to the longitudinal direction of the first shuttle arm (4) to a deformation of the geometrical structure (6) causing the displacement of the movable body and being directed in a second direction substantially perpendicular to the first direction, the deformation in this case being defined by the y-component 37 of maximum deformation.

Figure 12:
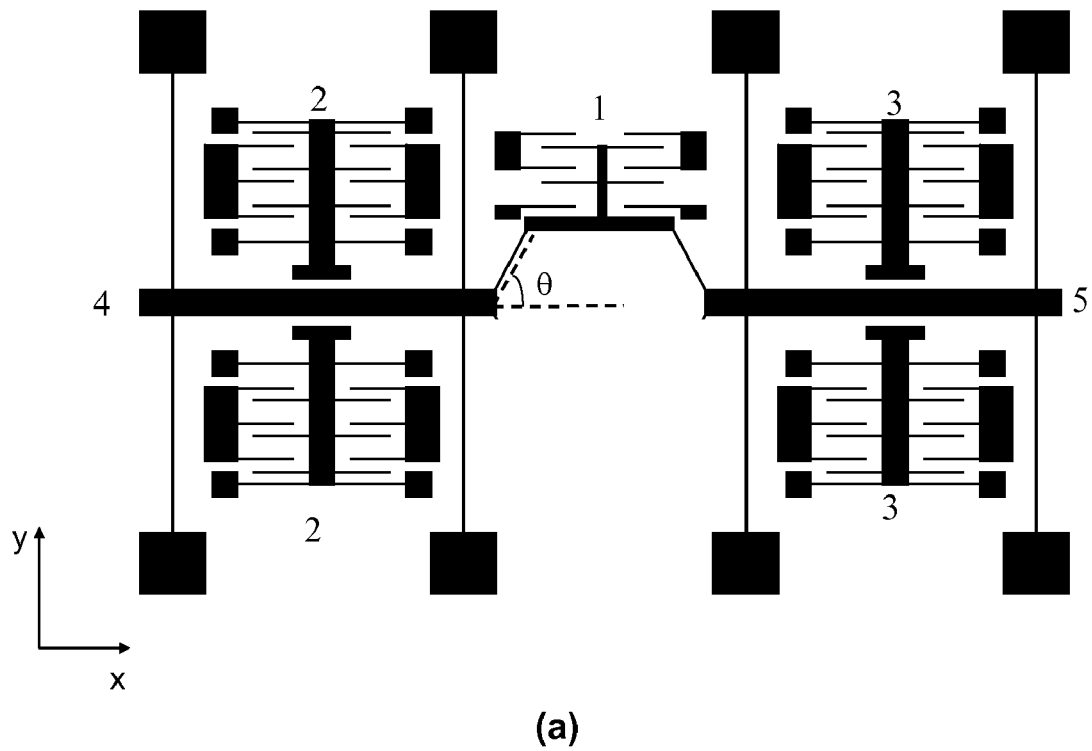
FIGS. 12(a-b) schematically show stepping actuators according to certain embodiments of the invention.
Figure 12:
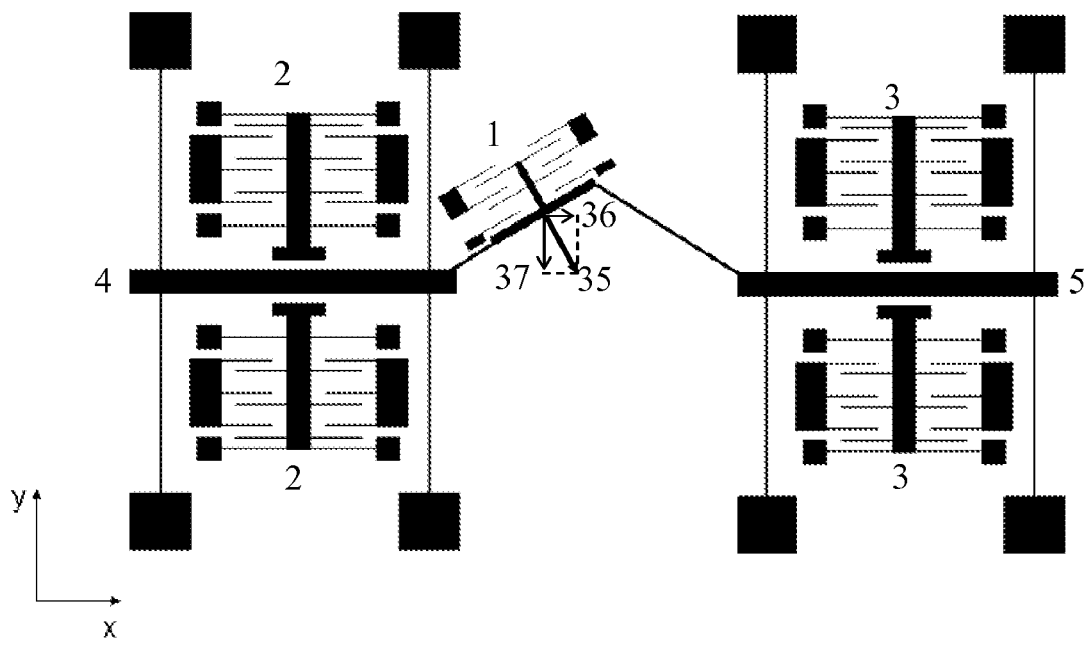

In case of FIG. 12(*b*) for example, where the geometrical structure 6 consists of two straight lines, the maximum deformation is found at the top of the geometrical structure 6 at the point where the two straight lines are contacting each other. Hence, for determining the displacement magnification ratio the y-component of this maximum deformation may be used. In case of an oval configuration of the geometrical structure 6 for example, as represented in FIG. 2(*b*), the maximum deformation may be found at the top or the bottom of the oval.

The geometrical structure 6 may preferably be an elastic structure. The parts of the geometrical structure 6, also called arms, that realize the deformation are called the drive springs or drive spring beams 8. The drive springs or drive spring beams 8 are coupled between the shuttle arms 4, 5 and the drive actuator 1 or the location where the drive actuator 1 actuates of the geometrical structure. Depending on the material and the shape of the geometrical structure 6, the force, e.g. drive voltage, required to realize the deformation may be different.

As already said above, the movable body 4, 5, 6 may be attached to the substrate, e.g. by means of loads 7. The actuator 10 illustrated in FIG. 1 comprises eight loads 7. However, according to other embodiments, the actuator 10 may comprise more or less loads 7.

Figure 4:
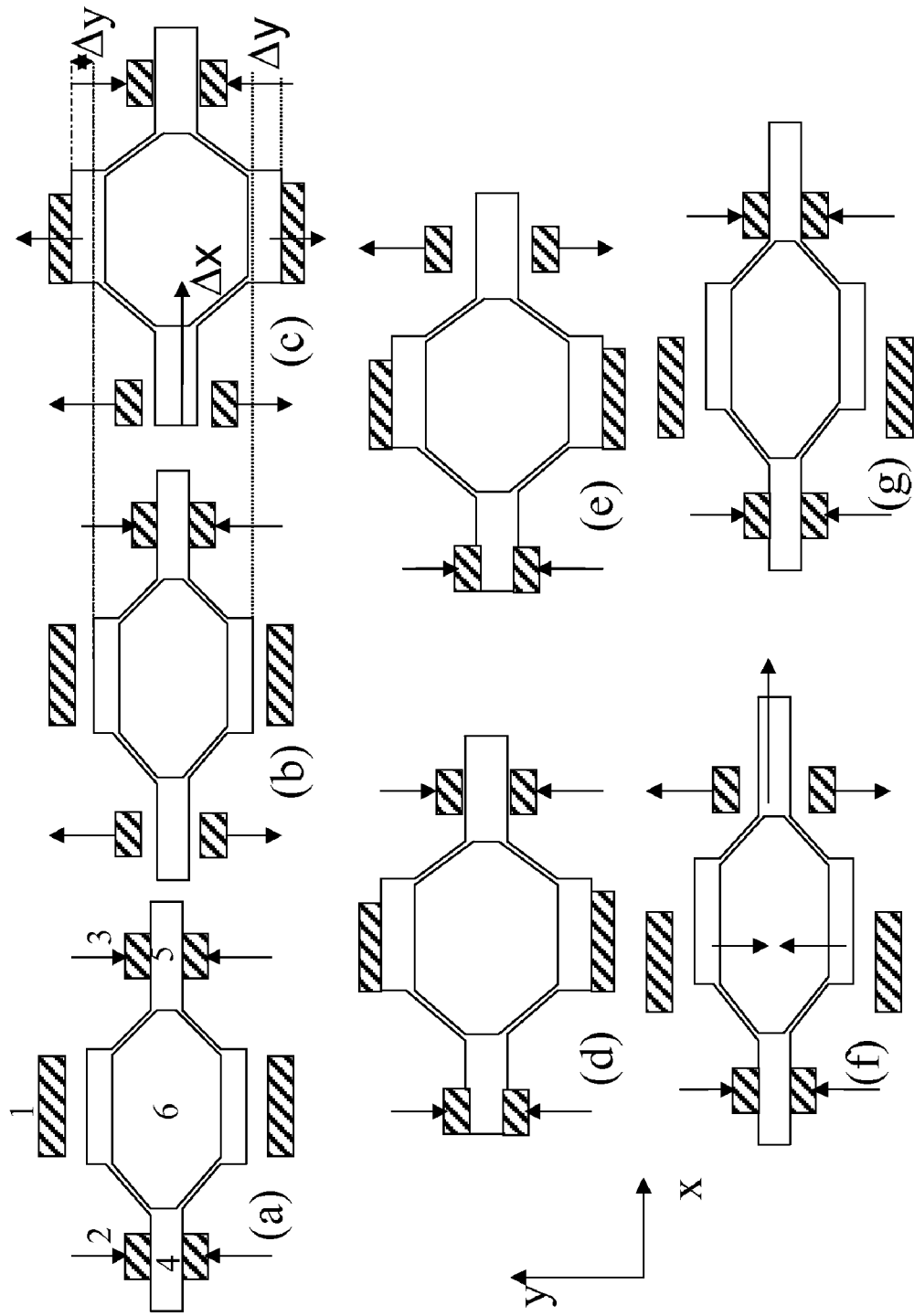
FIGS. 4(a-g) illustrate the operation principle of a stepping actuator according to an embodiment of the present invention.
Figure 5:
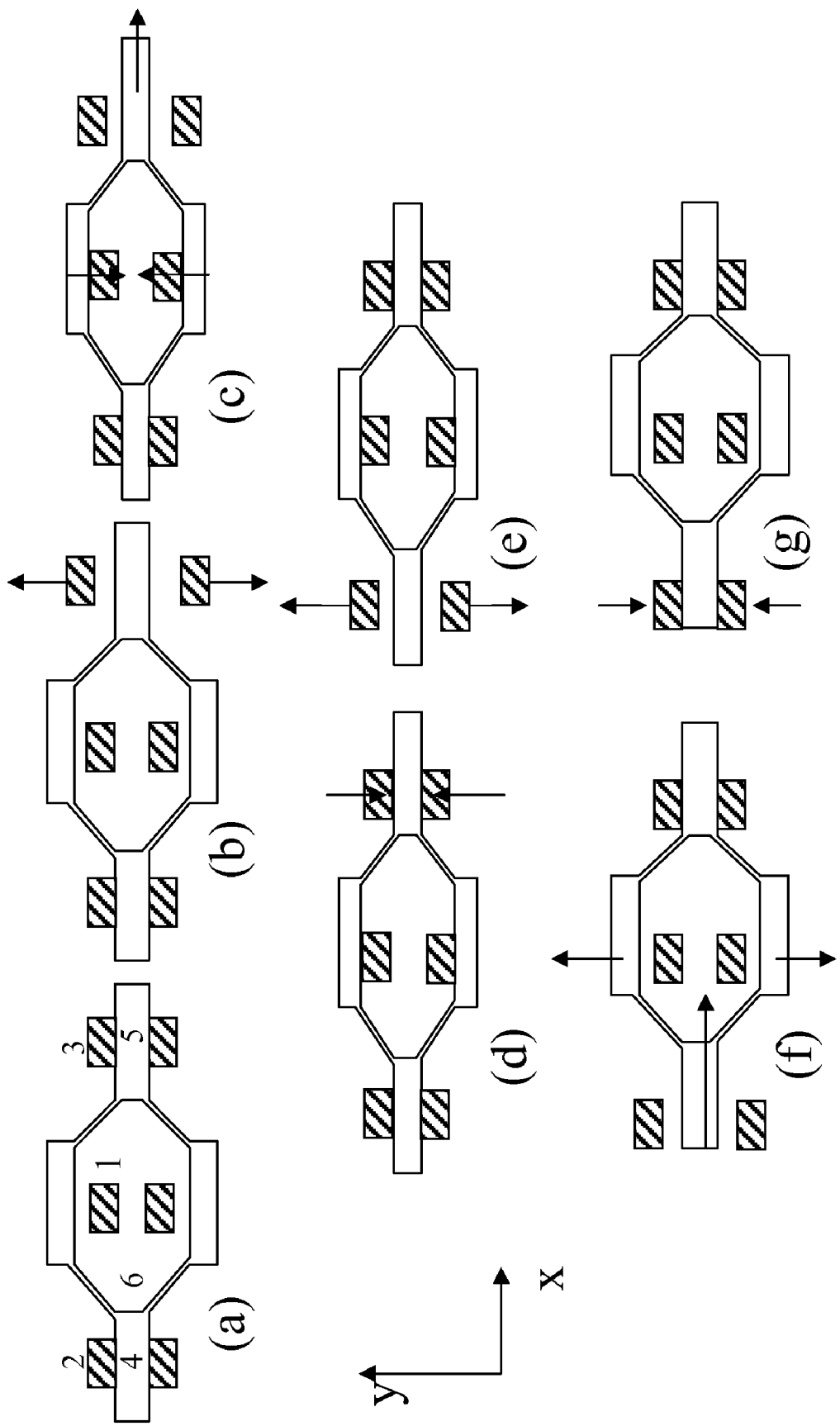
FIG. 5(a-g) illustrate the operation principle of a stepping actuator according to an embodiment of the present invention.

FIGS. 4(*a*)-4(*g*) and 5(*a*)-5(*g*) illustrate different steps of an operation cycle for microactuators 10 according to two different embodiments. FIGS. 4(*a*)-4(*g*) schematically illustrates the operation cycle of an actuator 10 according to certain embodiments of the invention whereby deformation of the geometrical structure 6, in the example given the hexagonal structure, in the y direction is performed by increasing the dimensions of the geometrical structure 6 in the y direction. FIGS. 5(*a*)-5(*g*) schematically illustrates the operation cycle in case of an actuator 10 according to certain embodiments of the invention whereby deformation of the geometrical structure 6, in the example given the hexagonal structure, in the y direction is performed by decreasing the dimensions of the geometrical structure 6 in the y direction. In FIGS. 4(*a*)-4(*g*) and 5(*a*)-5(*g*) the drive and latch actuators 1, 2 and 3 are illustrated schematically, thereby not showing all parts. It has to be understood that this is for the ease of illustration only and it is clear for a person skilled in the art that the drive and latch actuators 1, 2 and 3 comprise drive shuttles 11, drive electrodes 12, latches 21, latch electrodes 22, latch springs 23, and/or other elements, as for example illustrated in and described for FIG. 1. Any suitable implementation of the drive and latch actuators 1, 2, 3 may be used.

The operation cycle illustrated in FIGS. 4(*a*)-4(*g*) is as follows. In the initial state the latches 21 of respectively the first and second latch actuators 2, 3 are activated, thereby grabbing the shuttle arms 4 and 5 (step(a)). In Step (b), the latches 21 release the left arm 4 by deactivating latch actuator 2. In Step (c) it is illustrated that the drive actuator 1 creates a step displacement by being activated. Thereby the dimension of the geometrical structure 6 in a direction substantially perpendicular to the longitudinal direction of the shuttle arms 4, 5, in the example given in the y direction, is increased by 2Δy. As the trusses 11*b* of drive actuator 1 are moved, e.g. pulled, towards the drive electrodes 12, in-plane-angular conversion creates a displacement step of the free shuttle arm 4 in a direction substantially parallel to the longitudinal direction of the shuttle arm 4, in the example given in the x-direction, also referred to as moving direction. In Step (d), this displacement is maintained with the latches 21 of latch actuator 2 by reactivating the latch actuator 2. In Step (e), the latches 21 of latch actuator 3 are released by deactivating latch actuator 3 and in step (f) drive actuator 1 is released by deactivating latch actuator 3. As drive actuator 1 is released, it transfers the displacement step obtained on the left shuttle arm 4 to right shuttle arm 5. The original shape of the geometrical structure is restored. In a last step, step (g), the latches 21 of latch actuator 3 fix the second shuttle arm 5, thereby preserving this displacement step and completing the cycle. Reverse displacement can be obtained by activating the latches 21 of latch actuator 2 at the left instead of the latches 21 of latch actuator 3 at the right in Step (b). As already discussed above, the displacement of the movable body in a first direction is the displacement of the movable body during one operation cycle. This thus corresponds in the cycle illustrated in FIGS. 4(*a*)-4(*g*) to the displacement of the first shuttle arm 4 as a consequence of the deformation of the geometrical structure 6 (when activating the drive actuator 1, clamping the second shuttle arm 5 and releasing the first shuttle arm 4) and the displacement of the second shuttle arm 5 when restoring the shape of the geometrical structure 6 when deactivating the drive actuator 1 (thereby clamping the first shuttle arm 4 and releasing the second shuttle arm 5).

The operation cycle in FIGS. 5(*a*)-5(*g*) is the following. In the initial state both the latches 21 of latch actuators 2 and 3 are activated, thereby grabbing the shuttle arms 4, 5 (Step (a)). In Step (b), the latches 21 of latch actuator 3 releases the right shuttle arm 5 by deactivating latch actuator 3. In Step (c), drive actuator 1 creates a step displacement by moving, e.g. pulling in. Thereby the dimension of the geometrical structure 6, in the example given the hexagonal structure, in a direction substantially perpendicular to the longitudinal direction of shuttle arm 4, in the example given in the y direction, is decreased by 2Δy. It has to be remarked that according to this example, the drive actuator 1 is located within the geometrical structure 6, in the example given the hexagonal structure, and not outside the geometrical structure 6, as was the case in the example given in FIGS. 4(*a*)-4(*g*). As the trusses 11*b* of drive actuator 1 are pulled towards the drive electrodes 12, in-plane-angular conversion creates a displacement step of the free shuttle arm 5 in a direction substantially parallel to the longitudinal direction of the shuttle arm 5, in the example given in the x-direction, also referred to as moving direction. In Step (d), this displacement is maintained with the latches 21 of latch actuator 3 by reactivating latch actuator 3. In Step (e), the latches 21 of latch actuator 2 are released by deactivating latch actuator 2 and in Step (f) drive actuator 1 is released by deactivating it. As drive actuator 1 is released, it transfers the displacement step obtained on the right shuttle arm 5 to the left shuttle arm 4. The original shape of the geometrical structure is restored. In a last step, in Step (g), the latches 21 of latch actuator 2 fix the first shuttle arm 4, preserving this displacement step and completing the cycle. Reverse displacement can be obtained by activating the latches 21 of latch actuator 3 at the right instead of the latches 21 of latch actuator 2 at the left side in Step (b).

From the above it is clear that the change or deformation $\Delta y$ of the dimensions of the geometrical structure 6 in a direction substantially perpendicular to the moving direction, in the example given in the y direction, results in a displacement $\Delta x$ in the moving direction (see also FIGS. 1 and 2), in the example given the x direction. The ratio $\Delta x/\Delta y$ between these two displacements is called the displacement magnification ratio. In general, according to certain embodiments of the invention, the displacement magnification ratio is between 0.15 and 2, preferably between 0.2 and 0.75, at voltages of 15V or lower.

In case of the geometrical structure 6 being a hexagonal structure such as represented in FIGS. 1, 2(a), 4 and 5, $\Delta x$ can be written as:

$$\Delta x = 2\Delta y \tan \theta$$

the angle $\theta$ being defined as the angle between an imaginary line in the longitudinal direction of the first shuttle arm 4, extending from the first shuttle arm 4 in a sense away from a free extremity thereof, and the drive spring 8 of the geometrical structure 6, the drive spring 8 being attached to the first shuttle arm 4. Hence, the displacement magnification ratio can be written as:

$$\Delta x/\Delta y = 2 \tan \theta \quad (1a)$$

Figure 6:
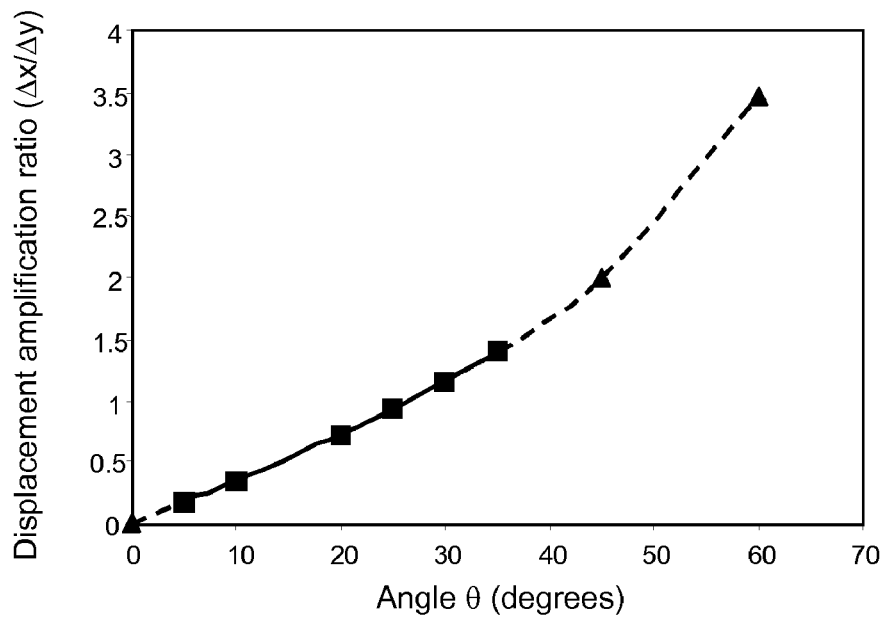
FIG. 6 shows displacement amplification ratio $\Delta x/\Delta y$ versus bent-beam angle for a stepping actuator according to certain embodiments of the present invention.

FIG. 6 shows displacement amplification ratio $\Delta x/\Delta y$ as a function of the angle $\theta$ for an actuator 10 as illustrated in FIG. 1. From the figure it can be seen that the ratio increases with increasing angle $\theta$. This indicates that by changing the angle $\theta$, the step size can be changed. Step sizes from 30 nm-40 nm up to 3 µm-4 µm can be achieved while keeping a low voltage, i.e. a voltage of 15V or lower. The dashed line connecting full triangles in FIG. 6 shows calculated results while the full line connecting full squares shows experimental results determined by FEM (Field Emission Microscopy). It can be seen that the experimental results are in accordance with the calculated results. As already said, according to certain embodiments of the invention, the displacement magnification ratio is between 0.15 and 2, preferably between 0.2 and 0.75.

For hexagonal structures 6 and using Eq. (1a), it can be calculated that the angle $\theta$ may be between 5° and 45°, preferably between 7° and 20°. This will be proven experimentally hereinafter.

Hereinafter, an analytic model is derived, specifically for the hexagonal topology of the geometrical structure 6 of the actuator 10 according to certain embodiments of the invention and as represented in FIG. 1. However, discussion about beam bending and slipping may also be valid for other actuators 10 with other shapes for the geometrical structure 6. By "slipping" is meant the loss of some of the cumulative displacement during actuator operation because of lack of latching forces. In literature there often is an out-of-plane deflection conversion which results in a bent-beam angle $\theta$ of 0°. As already discussed above, the bent-beam angle $\theta$ may be defined as the angle between an imaginary line in the longitudinal direction of the first shuttle arm 4, extending from the first shuttle arm 4 in a sense away from a free extremity thereof, and the drive spring 8 of the geometrical structure 6, the drive spring 8 being attached to the first shuttle arm 4. According to certain embodiments of the present invention, this angle $\theta$ can be varied. In the following description the terms bent-beam angle and angle will be used next to each other. It should be understood that these terms both indicate the same angle.

Figure 7:
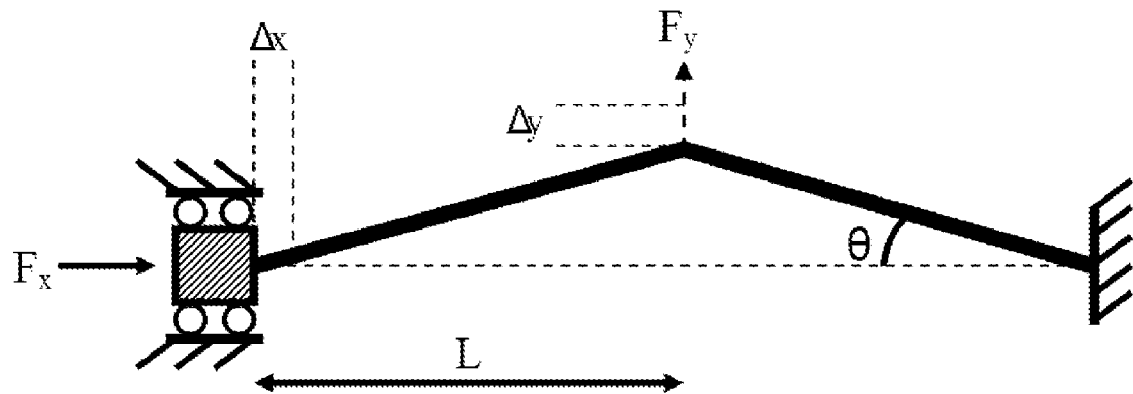
FIG. 7 illustrates calculation of spring constants of actuators using a bent-beam model according to the prior art. (Y. B. Gianchandani and K. Najafi, "Bent-beam strain sensors," J. Microelectromechanical Syst., vol. 5, no. 1, pp. 52-58, 1996.)

In case of the drive and latch actuators being of the pull-in type, the pull-in voltage expression for the drive and latch actuators 1, 2, 3 may be given by:

$$V_{pull-in} = \sqrt{\frac{8kd^3}{27\varepsilon A_{cap}}} \quad (2)$$

wherein k is the total spring constant of the drive springs 8 and latch springs 23, d is the gap between comb fingers or arms, $\varepsilon$ is the permittivity constant of the material filling the gap, e.g. air, and $A_{cap}$ is the total capacitance area of the actuator 10. The total spring constants for the latch springs 23 of latches 21 can be calculated using beam deflecting formulae, known by a person skilled in the art. For the drive part, a bent-beam spring model should be used. In FIG. 7 a schematic representation is given of a bent-beam model for the calculations of the spring constants for the drive actuators 1.

The bent-beam deflection $\Delta y$ is given by Y. B. Ginchanani and K. Najafi (J. Micromech. Syst. 5 (1), p 52-58 (1996)) and can be described by:

$$\Delta y = 2\frac{\tan\theta}{\sqrt{\frac{F_x}{EI}}}\tan\left(\frac{L\sqrt{\frac{F_x}{EI}}}{2}\right) - L\tan\theta \quad (3)$$

wherein $F_x$ is the force exerted on the geometrical structure 6 in order to obtain a deformation of this geometrical structure 6, L is half of the length of the beam, E is the Young's modulus and I is the moment of inertia of the spring beam 8. For the ease of understanding, $F_x$, L, and $\theta$ are indicated in FIG. 7.

Using a Taylor series approximation, Eq. (3) can be simplified and can be written as:

$$\Delta y = \frac{1}{12}\frac{F_x L^3}{EI}\tan\theta \quad (4)$$

The force-deflection conversion equations are:

$$\Delta x = 2\Delta y \tan \theta$$

$$F_x \Delta x = F_y \Delta y \quad (5)$$

Combining Eq. (4) with the force-deflection conversion Eq. (5), the total spring constant for the drive part can be expressed as:

$$k_{drive} = 2\frac{F_y}{\Delta y} = 4\frac{12EI}{L^3} \quad (6)$$

Similarly to Eq. (6), the effective spring constant of the drive part along the x-direction can also be written as:

$$k_x = \frac{12EI}{L^3} \frac{1}{\tan^2\theta} \quad (7)$$

When Eq. (5) is more explicitly written, the expression for the step size of the actuator 10 can be found as:

$$\Delta x = 2(d_d - d_{d\_stop})\tan\theta \quad (8)$$

wherein $d_d$ is the drive gap 14 and $d_{d\_stop}$ is the drive stopper gap 15. Eq. (8) indicates that, by only changing the bent-beam angle θ, step sizes varying from nanometers to micrometers can be obtained.

When the actuator 10 starts moving in one direction, the load springs 7 will create a force which depends on the cumulative displacement, or in other words on the number of steps and the magnitude of the step size. This load related force will affect steps (c) and (f) of the operation cycle (see FIGS. 4(a)-4(g) by bending the drive spring beams 8 of the geometrical structure 6, in the example given of the hexagonal structure 6. This yields a hysteresis-like operation as the step size of the actuator 10 varies with cumulative displacement and the direction of the movement. When the actuator 10 goes in one direction, the forward step sizes will be different from coming back, backward, step sizes. Using Eq. (7), the magnitude of this variation of the step size can be calculated as:

$$\Delta(\Delta x) = \pm 2 \frac{F_x}{k_x} \quad (9)$$

$$= \pm 2 \frac{X_{cum} \frac{k_{load}}{2}}{k_x}$$

$$= \pm \frac{X_{cum} k_{load}}{\frac{12EI}{L^3}} \tan^2\theta$$

wherein $X_{cum}$ is the cumulative displacement and $k_{load}$ is the total load spring constant. Eq. (9) can be rewritten in percentage format as:

$$100 \frac{\Delta(\Delta x)}{\Delta x}\% = \pm 50 \frac{X_{cum} k_{load}}{\Delta y \frac{12EI}{L^3}} \tan\theta \% \quad (10)$$

indicating that smaller bent-beam angles θ reduces the beam bending and thus the hysteresis problem which was described above.

Figure 8:
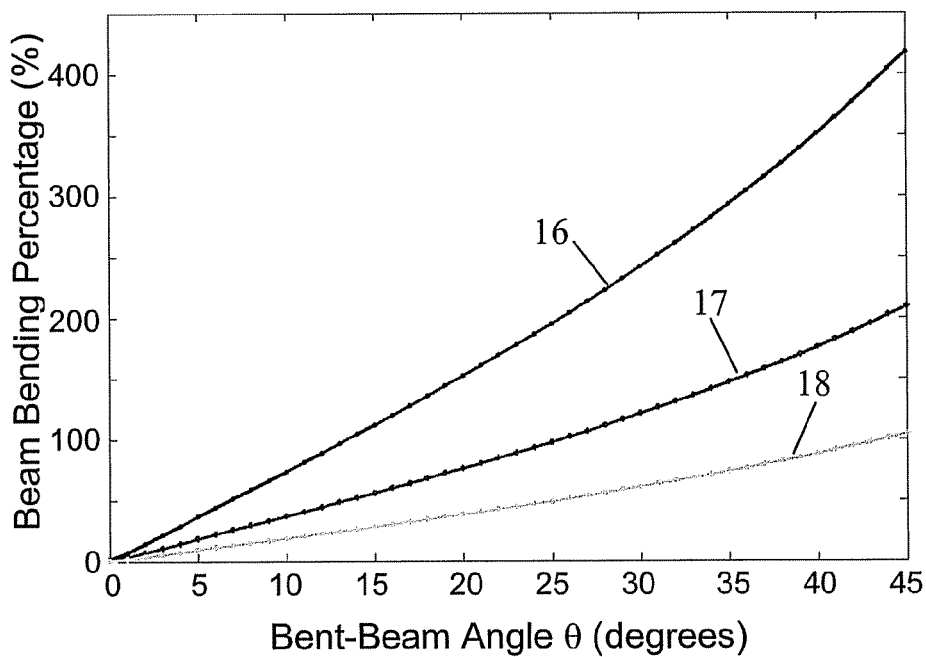
FIG. 8 shows beam bending percentage versus bent-beam angle for a stepping actuator according to certain embodiments of the invention.

The movable body 4, 5, 6 is moved step by step away from the starting position. When stepping, the load spring 7 causes a decrease in the step size. For example a starting step size of 4 μm, being reduced to 3 μm or 2 μm. When returning, the initial step size will be larger, for example 6 μm, after some steps this can be 5 μm, and finally again 4 μm which was the step size when starting. FIG. 8 further illustrates the beam bending problem using simulation results. Curve 16 shows the results for a load of 100 μN, curve 17 for a load of 50 μN and curve 18 for a load of 25 μN. The simulations were performed using a sample actuator design with changing bent-beam angle θ and load characteristics. It can be seen from FIG. 8 that beam-bending increases with increasing bent-beam angle θ. Furthermore beam-bending also increases with increasing load. The maximum cumulative displacement range was aimed to be 40 μm. However, when the beam-bending percentage reaches 100% for a given bent-beam angle, the maximum range will be smaller than 40 μm due to maximum beam bending. Further stepping will not contribute to additional displacement. Hence, a theoretical maximum range for a given actuator design can be calculated when the beam-bending percentage is chosen to be 100%. To achieve a larger range with larger forces and smaller beam-bending (or smaller hysteresis) smaller bent-beam angles are required.

The actuator 10 maintains the cumulative displacement due to friction forces between the latches 21 and the shuttle arms 4, 5. Therefore, the friction forces generated by the latches 21 should be larger than the tangential forces acting on the shuttle arms 4, 5 to prevent slipping of the actuator 10. Tangential forces do not only comprise the load forces acting continuously but also—and more importantly—the reaction force during the drive cycle emanating from the drive spring beams 8 (see step c and f in FIGS. 4(a)-4(g). Hence, at any displacement the following inequality is needed to have a non-slipping operation:

$$F_{reaction} + F_{load} < F_{friction} \quad (11)$$

$$(\Delta x + \Delta(\Delta x))k_x + k_{load}X_{cum} < F_{grip}\mu_{static},$$

$$F_{grip} = 2F_{latch} = \frac{\varepsilon A_{cap\_latch}(V_{applied})^2}{(d_l - d_{l\_stop})^2}$$

wherein ($d_l$-$d_{l\_stop}$) is the effective latch stopper gap 25 (also referred to as $d_{eff}$). When Eqs. (7), (8), (9) and (11) are combined, it can be determined that the following can be desirable in order to minimize slipping problems:

a small effective latch stopper gap 25 of lower than 0.5 μm;
a high applied voltage of higher than 20 V (preferably higher than 30 V);
a large static friction coefficient of ~1; and/or
a large bent-beam angle of higher than 5° (preferably higher than) 7°)

Figure 9A:
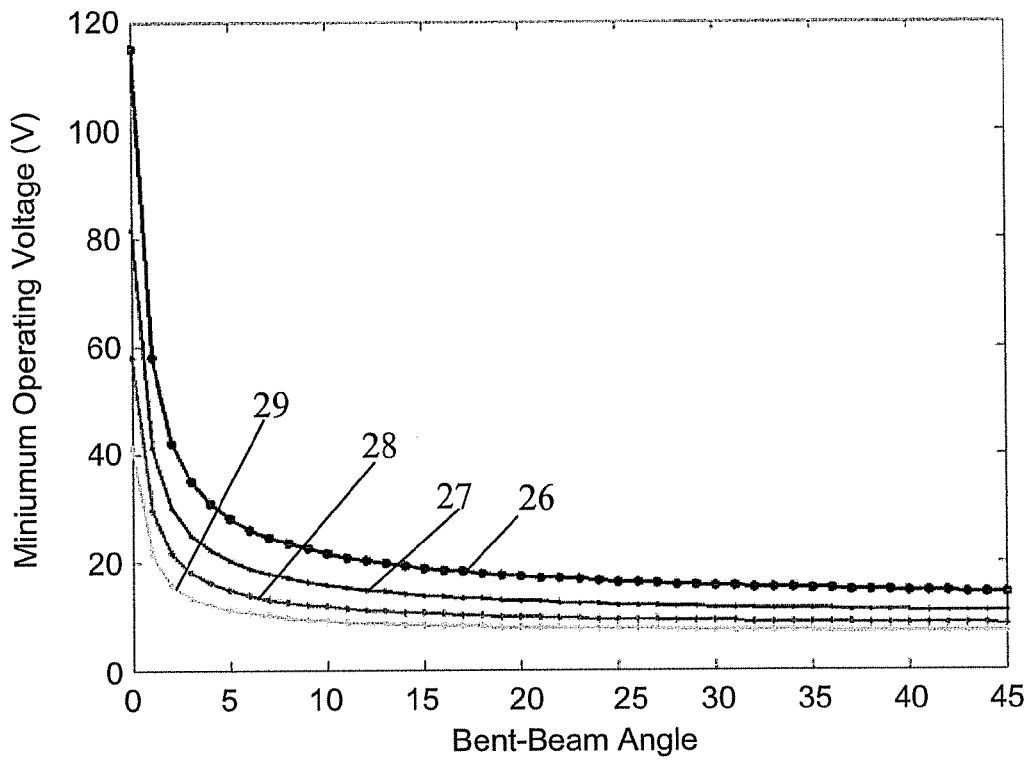
FIG. 9 shows minimum latch voltage versus the bent-beam angle for a stepping actuator according to certain embodiments of the invention.
Figure 9B:
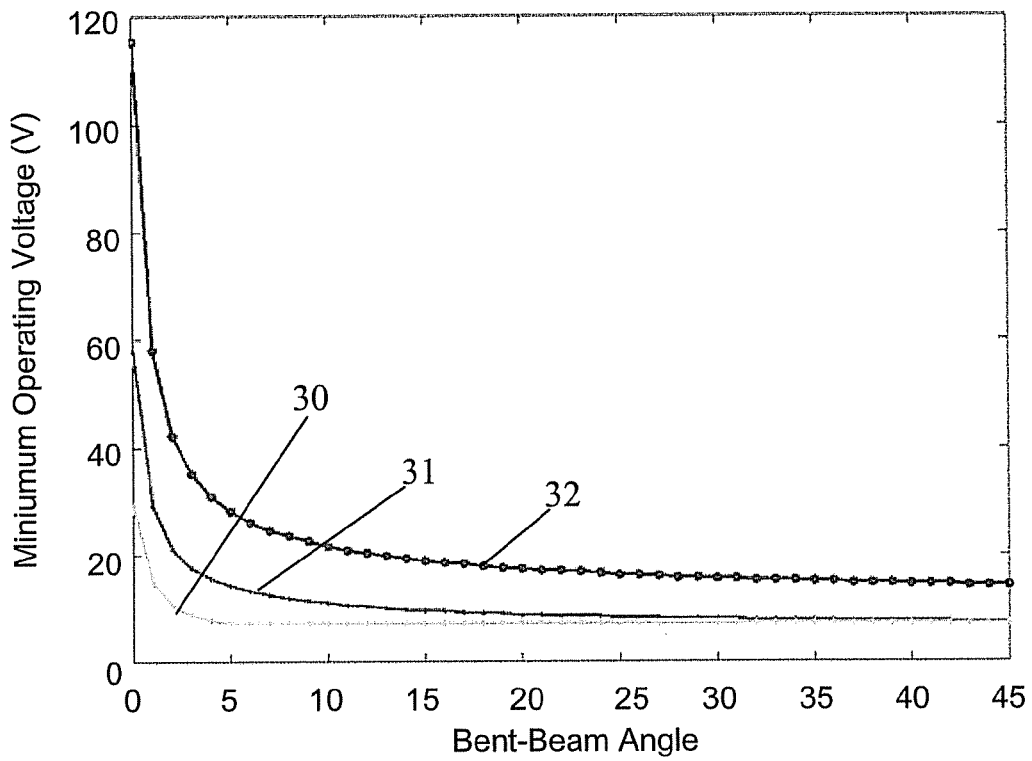

To realise the inequality in Eq. (11) either the latch voltage can be increased or the bent-beam angle can be increased. FIG. 9 further clarifies this problem with simulation results. Simulations were performed to calculate the minimum latch voltage required to hold Eq. (11) using a sample actuator design with changing parameters. The parameters that were changed for the simulations were static friction coefficient $\mu_{static}$, effective latch stopper gap $d_{eff}$ and bent-beam angle θ. FIG. 9a shows minimum latch voltage as a function of bent-beam angle for different values of $\mu_{static}$ (curve 26 for $\mu_{static}$=0.1, curve 27 for $\mu_{static}$=0.2, curve 28 for $\mu_{static}$=0.4 and curve 29 for $\mu_{static}$=0.8). FIG. 9b shows minimum latch voltage as a function of bent-beam angle for different values of $d_{eff}$ (curve 30 for $d_{eff}$=0.25 μm, curve 31 for $d_{eff}$=0.5 μm and curve 32 for $d_{eff}$=1 μm). From FIG. 9a it can be seen that the minimum latch voltage increases with decreasing static friction coefficient. From FIG. 9b it can be seen that minimum latch voltage increases with increasing effective latch stopper gap 25.

For angles above 5°-7°, reaction forces start to become comparable with the load spring forces. For very small angles (~0°), the reaction force component can become large compared to the load spring forces. In this case, large latching forces in the order of mN are desirable. Latching forces are friction forces resulting from electrostatic forces and can be increased by increasing the latch voltage, increasing the static friction coefficient $\mu_{static}$ or decreasing effective latch stopper gap $d_{eff}$. When low operating voltages, i.e. operating voltages of lower than 10V, and small angles, i.e. angles of ~0°, are needed, it can become difficult to realize the inequality of Eq. (11), even with a very small effective latch stopper gap $d_{eff}$ and a high static friction coefficient $\mu_{static}$. Moreover, static friction coefficient $\mu_{static}$ and effective latch stopper gap $d_{eff}$ are highly process dependent and not easy to control.

This is one of the reasons why actuators such as shuffle motors in the literature use high voltages (up to 150 V). They still suffer from slippage because of the 0° angle, but their excessively high voltage compensates for this problem.

Hence, the selection of a large bent-beam angle θ can be selected as the parameter to obtain low latch voltage, i.e. a latch voltage of lower than 15V, preferably lower than 10V, as it is more design-dependent. However, this solution creates the necessity for making a compromise with beam-bending. If a large bent-beam angle θ is used, the actuator 10 can operate at lower voltages, i.e. at voltages of lower than 15V, preferably lower than 10V, but it suffers from beam-bending as was explained with respect to FIG. 8. On the other hand, small bent-beam angles θ minimize beam-bending problems but require larger operating voltages to minimize slippage. Hence, a careful design should be performed to obtain an optimum beam-bending with minimum slippage.

From the above it is thus clear that the bent-beam angle θ can affect the minimum possible operating voltage of the actuator 10. The reaction forces during the operation are highly dependent on this angle θ. The smaller the angle θ, the larger the reaction forces. Hence, larger operating voltages are needed to overcome these large reaction forces. The larger the angle θ, the smaller the reaction forces, and the smaller the operating voltages which can be used. This is illustrated in FIG. 9. In one embodiment of the invention, the bent-beam angle can be larger than 5° to have relatively small operating voltages, i.e, operating voltages of 15V or lower, preferably 10V or lower. At angles θ above 25° to 30° there is no significant gain in operation voltage, especially in latch voltage, but at these larger angles hysteresis and beam-bending effect may become worse. This means that according to certain embodiments of the present invention the bent-beam angle θ may vary between 5° and 45°, preferably between 5° and 30°, more preferably between 7° and 20°.

From FIG. 9(a) it became clear that the static friction coefficient plays an important role in determining the minimum operating voltage. Hence, according to certain embodiments of the invention it may be necessary to take measures for obtaining a higher static friction coefficient, such that a lower operating voltage can be used. This may be done by providing an additional material with a higher static friction coefficient at the top and/or at the sidewalls of the geometrical structure 6, e.g. hexagonal structure. Providing an additional material may be done by deposition of that material by, for example, sputtering or CVD. In that way, the static friction coefficient of the actuator 10 may be changed, and hence the operating voltage required for this actuator 10 consequently also changes.

Hereafter examples of the invention will be described. It should be understood that these examples are meant only to further describe the invention, and are not intended to limit the invention in any way.

Example 1

In a first experiment, six different actuator designs were fabricated with bent-beam angles θ of 0°, 15° and 45°, corresponding to step sizes of respectively 20 nm, 1 μm and 4 μm. Voltages to be applied to drive and latch actuators 1, 2, 3 were determined to be of 5V, 7V and 13V by using Eq. (2). The designed values of $d_{eff}$ were 0.25 μm, 0.5 μm and 1 μm. Through the use of different actuator areas and load springs 7, the aim was to obtain forces from ±30 μN to ±110 μN. The above described parameters are summarized in Table I.

TABLE I

Summary of designed actuators according to the first experiment.

| Design | $V_{pull-in}$ D-L | $d_{eff}$(μm) | θ(°) | Range (μm) | $V_{no-slip}$ |
|---|---|---|---|---|---|
| 1 | 11.0-10.8 | 1.00 | 45 | ±34 | 23 |
| 2 | 3.9-7.0 | 0.25 | 15 | ±26 | 8 |
| 3 | 3.9-7.0 | 0.50 | 15 | ±26 | 12 |
| 4 | 2.5-4.6 | 0.25 | 15 | ±18 | 6 |
| 5 | 2.5-4.6 | 0.50 | 15 | ±18 | 8 |
| 6 | 7.1-7.0 | 0.25 | 0 | ~5000 | 42 |

Maximum actuation ranges are obtained using Eq. (9). The practical limit for the maximum range is ±40 μm due to comb finger design, but this can be increased with some modifications. The no-slip voltage is the minimum voltage required for Eq. (11) to hold. In the calculations a static friction coefficient $\mu_{static}$ of 0.1 was used.

The SOIMUMPs (Silicon on Insulator Multi User MEMS Processes) process, which is an SOI (Silicon on Insulator) based MUMPs (Multi User MEMS Processes, MEMS=micro-electromechanical system), was chosen for the fabrication of the actuators 10 used in experiment 1.

The process defines structural layers by patterning top silicon with DRIE (Deep reactive ion etching). The suspended structures are defined by backside patterning of the bottom silicon. The structures are then released by vapor HF (hydrofluoric acid).

In detail, a silicon-on-insulator (SOI) wafer, having a 25 μm thick top silicon layer, a 1 μm thick $SiO_2$ insulating layer in between and a silicon handle wafer at the bottom with a thickness of ~400 μm, was used as a starting substrate. The process starts with the provision of a 520 nm metallization layer (20 nm Cr/500 nm Au) by a first lithography step, evaporation, and lift-off. After this metallization, a second lithography step is performed to define patterns of the top silicon layer. These patterns are transferred to the top silicon layer by DRIE. Then, a third lithography is performed at the backside of the wafer. The bottom silicon layer is then etched. In this step, 400 μm of the bottom silicon layer is etched away by DRIE. Then, 1 μm thick $SiO_2$ insulating layer between two silicon layers is time-etched using vapour HF. This final etch releases the actuator structures.

The above-described process is a fast process with a 25 μm thick top single-crystal silicon layer and 2 μm critical dimensions, i.e. minimum dimensions that can be patterned, allowing aspect ratios (height/width) of more than 12 at the capacitive gaps, at the latch stopper gap 25 and the drive stopper gap 15. Especially at the latch stopper gap 25 a high aspect ratio is advantageous to obtain small effective latch stopper gaps 25. As the process is commercially available, it is easy and fast and relatively cheap.

Samples having 0.25 μm and 0.5 μm effective latch stopper gaps 25 needed additional post-processing because of stiction problems, meaning that comb fingers collapse during moving, e.g. during pull-in. Therefore 100 nm $SiO_2$ layer as a dielectric material is sputtered on top of a 50 nm Al layer to distribute the charge accumulated in the dielectric. Alternating driving voltages were used to cancel out the accumulated charge.

Tests were performed using a Karl Suss probe station equipped with a camera with 100× magnification. A printed circuit board for device control was designed using AT2313 microprocessor for the drive electronics.

Device 1 (see Table I) did not show any stiction problems, i.e. collapsing of comb fingers during moving, e.g. during pull-in. This is due to the relatively large $d_{eff}$ of 1.0 μm. However, for the other devices 2 to 6 (see Table I), stiction was observed during moving, e.g. during pull-in, because of electrical shorts during beam collapse. To prevent such electrical shorts, a 100 nm $SiO_2$ layer was sputtered onto the samples, and a maskless $CHF_3$ based RIE was performed to open the metal pads. However, stiction was still present due to charge accumulation in the dielectric. Hence, first sputtered a 50 nm Al layer was sputtered to uniformly spread the charges accumulated on the dielectric, followed by a 100 nm $SiO_2$ layer. Stiction is considerably reduced under low frequency cycling (few Hz) and repeatable operation is achieved. Also the control circuit was modified to supply both positive and negative switching signals to cancel out the accumulated charge. This way stiction was minimized and repeatable operation at higher frequencies (~75 Hz) could be obtained.

The maximum achievable range is limited by beam bending according to the model except for Device 6 (see Table 1). In case of Device 6, the theoretical maximum achievable range is very large; but the practical maximum achievable range is limited by the comb finger design of the actuator 10. The drive shuttle movement will be blocked by the drive electrodes 12 after 40 μm of cumulative displacement, as this is the distance between the comb fingers 11a on the drive shuttle 11 and the drive electrodes 12 (or between the drive shuttle 11 and the comb fingers of the drive electrode 12a). Consequently, the maximum achievable range for Device 6 will be the distance between—the comb fingers 11a of the drive shuttle 11 and the drive electrode 12 or between the drive shuttle 11 and the comb fingers of the drive electrode 12a.

Hence, to find the maximum range, each actuator is operated during several cycles under slightly higher operating voltages. The voltage is kept high to ensure that slipping is minimized. With slipping is meant the loss of some of the cumulative displacement during actuator operation due to a lack of latching forces. Measured maximum ranges are found to be very similar to those determined for the model (see Table I). Device 1 results in a 35 μm displacement and Device 4 in ±24 μm displacements.

Figure 10:
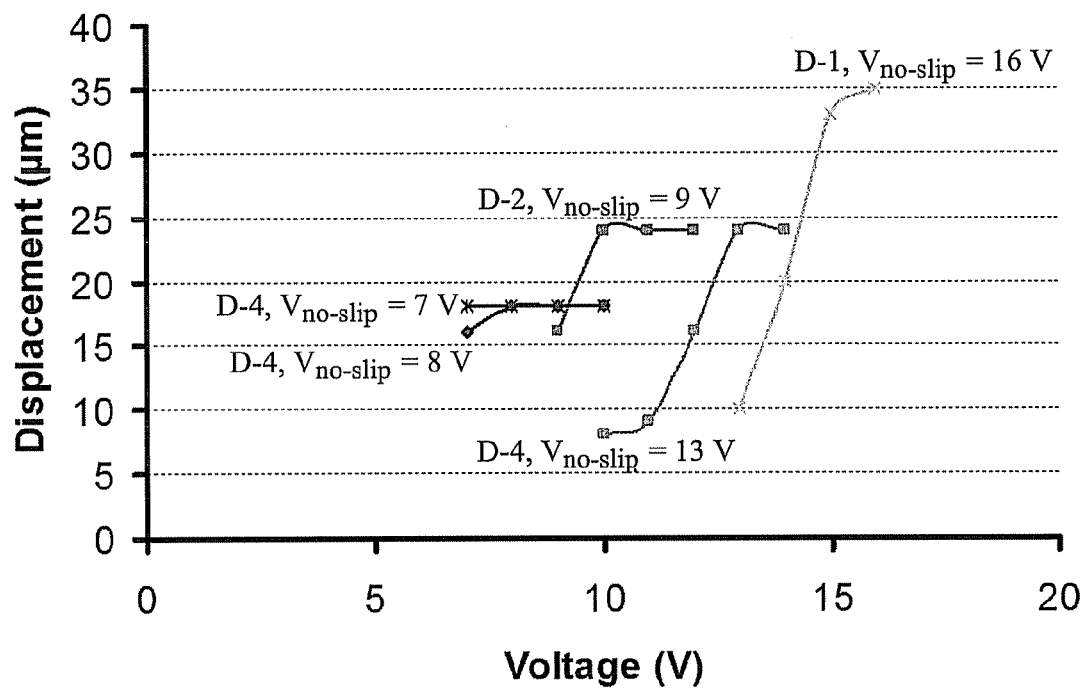
FIG. 10 illustrates displacement results for different latch voltages applied to latch actuators, for a plurality of devices.

Also different latch voltages were applied to each actuator. The cumulative displacement at each latch voltage was measured for 30 actuation steps. This test was performed to observe slipping. At low latch voltages, latching forces are not sufficiently high to overcome the tangential forces, and slipping occurs. This causes a drop in the displacement. If the maximum displacement range cannot be achieved under a certain latch voltage, there is an indication that the latching forces are not high enough to overcome tangential forces, and slipping occurs. FIG. 10 illustrates displacement results for actuators Devices 1 to 5 applied at different latch voltages for 30 steps. Under low latch voltages, latching forces are not sufficiently high to overcome the tangential forces, and slipping occurs. This causes a drop in the displacement, as can be seen from FIG. 10. For Device 1, the maximum range was achieved at lower latch voltages, i.e. 16V (indicated in FIG. 10) than the expected 23V (see Table I). This change is probably resulting from a larger actual static friction coefficient than 0.1 that was used in the calculations. For Devices 2 to 5, the results are very close to those of the model as was discussed above. For the Devices 2 to 5 operating voltages were obtained of between 6 and 12 V at a bent-beam angle of 15°.

Example 2

The static friction coefficient $\mu_{static}$ is an important parameter affecting slipping. The static friction coefficient $\mu_{static}$ of the Si—Si contact (Device 1) was measured as well as the static friction coefficient $\mu_{static}$ of the sputtered $SiO_2$—$SiO_2$ contact (Devices 2 to 5).

First, the devices are operated to obtain a maximum displacement range. Then the latching voltage is slightly decreased in steps of 0.1V until the first slipping occurs. Then the normal force and the tangential force are calculated using electrostatic force equations and load spring calculations respectively. The static friction coefficient $\mu_{static}$ is then calculated using the ratio of the two forces. An average friction coefficient $\mu_{static}$ of 0.15 is found for the Si—Si contact and of 0.04 for the $SiO_2$—$SiO_2$ contact. The latch stopper gaps 25 in the latch-shuttle interface are designed as 1.5 μm and 1.75 μm to obtain a $d_{eff}$ of 0.5 μm and 0.25 μm, respectively.

One important advantage of the in-plane topology according to certain embodiments of the invention is the possibility to measure the static friction coefficient of different materials. With an additional deposition step, for example with sputtering or CVD, as already explained above, the static friction coefficient $\mu_{static}$ of various materials can be tested. With this extra deposition step, material is deposited at the top and at the sidewalls of the actuator structure. That way, friction between latch 21 and shuttle arms 4 5 can be tested. That way a material with higher static friction coefficient $\mu_{static}$ can be selected, such that a lower latching voltage can be used. Metals such as Au, Ag, Al, Cu, or Pt having static friction coefficients ~1 can be used.

Example 3

Figure 11:
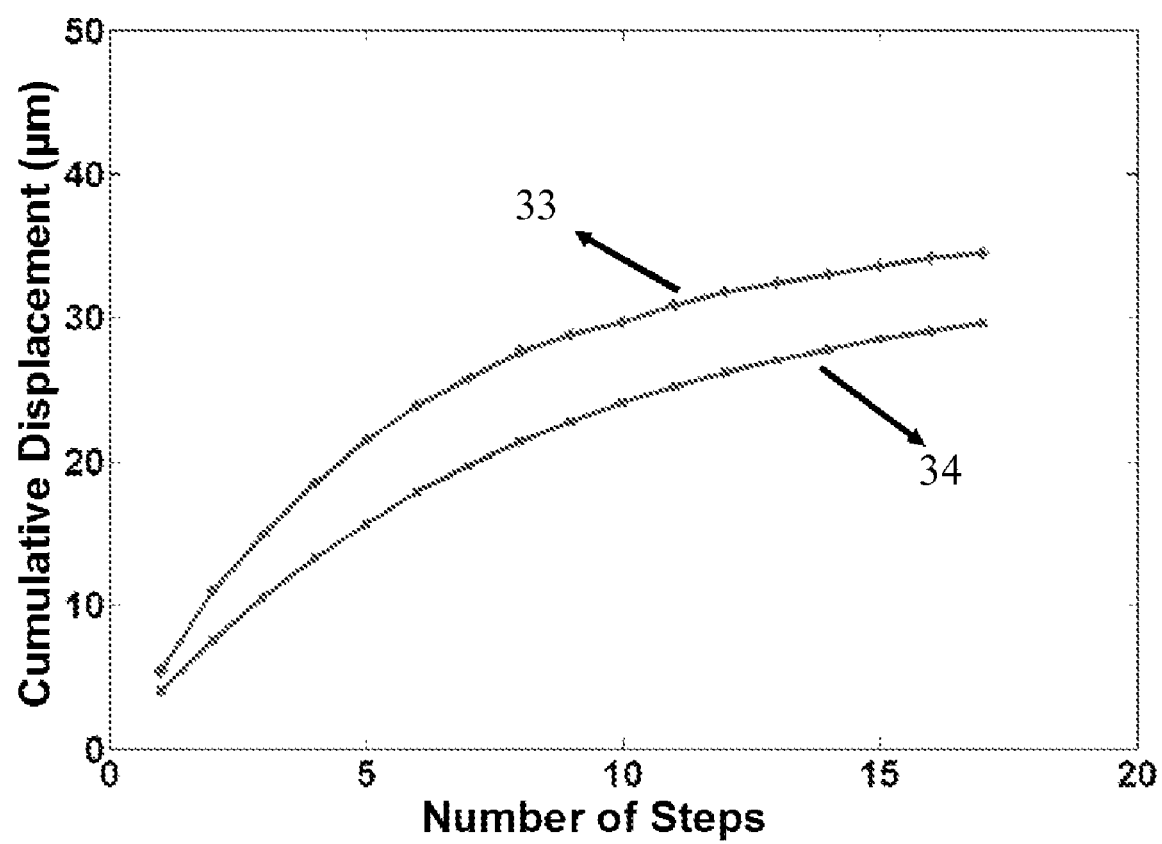
FIG. 11 shows measured cumulative displacement characteristics as a function of the number of steps for a stepping actuator according to certain embodiments of the present invention.

Also the cumulative displacement versus cycle time was measured for Device 1. This was performed at 16V. Slipping problems at this voltage cannot be fully eliminated. However, the results show a good agreement with no-slipping beam-bending cumulative displacement calculations. FIG. 11 shows measured (curve 33) and calculated (curve 34) cumulative displacement characteristics at 16V for device 1. The measured cumulative displacement characteristic (curve 33) is found to be similar to but having slightly larger values than the calculated cumulative displacement characteristic (curve 34). This difference is due to the drive actuator stopper design, i.e. the stoppers are designed as comb fingers and are not sufficiently rigid to totally block the movement, e.g. pull-in movement. They bend during each movement, e.g. pull-in, of the geometrical structure 6 and increase the step size.

Device 6 showed stiction related to charge accumulation due to the very high voltages of higher than 30 V.

Example 4

Lifetime tests were done with Device 1 using a 1 KHz cycling frequency. It reached more then 25 million cycles without significant performance deterioration. This illustrates good performance of the devices according to certain embodiments of the invention.

It is to be understood that although preferred embodiments, specific constructions and configurations, as well as materials, have been discussed herein for devices according to the present invention, various changes or modifications in form and detail may be made without departing from the scope of this invention as defined by the appended claims.

What is claimed is:

1. A stepping actuator comprising:
   a movable body comprising a geometrical structure having attached at opposite sides thereto a first shuttle arm having a first longitudinal direction and a second shuttle arm having a second longitudinal direction,
   at least one drive actuator co-operative with the geometrical structure to drive the stepping actuator, and
   at least two latch actuators operative to latch the stepping actuator, a first of the latch actuators being co-operative with the first shuttle arm and a second of the latch actuators being co-operative with the second shuttle arm,
   wherein the geometrical structure comprises
      at least two drive springs between the shuttle arms and the at least one drive actuator, wherein the total length of the drive springs in the first direction is larger than the total height of the drive springs in the second direction, and
      at least three rigid parts at the location of the two shuttle arms and the drive actuator, and
   has a displacement magnification ratio of between 0.15 and 2 at operating voltages of 15V or lower, the displacement magnification ratio being defined as the ratio of a displacement of the movable body in a first direction substantially parallel to the longitudinal direction of the first shuttle arm to a deformation of the geometrical structure causing the displacement of the movable body and being directed in a second direction substantially perpendicular to the first direction.

2. A stepping actuator according to claim 1, wherein the displacement magnification ratio is between 0.2 and 0.75.

3. A stepping actuator according to claim 1, wherein the geometrical structure is a hexagonal structure.

4. A stepping actuator according to claim 3, wherein the displacement magnification ratio of the hexagonal structure is defined as $\Delta x/\Delta y = 2 \tan \theta$, wherein $\Delta x$ is the displacement of the movable body in the first direction, $\Delta y$ is the deformation of the geometrical structure in the second direction, and $\theta$ is defined as the angle between an imaginary line in the longitudinal direction of the first shuttle arm, extending from the first shuttle arm in a sense away from a free extremity thereof and a drive spring of the geometrical structure, the drive spring being attached to the first shuttle arm, wherein $\theta$ is between 5° and 45°.

5. A stepping actuator according to claim 4, wherein $\theta$ is between 7° and 20°.

6. A stepping actuator according to claim 1, wherein the drive actuator comprises at least one drive shuttle part.

7. A stepping actuator according to claim 1, wherein the drive actuator comprises at least one drive shuttle part attached to the geometrical structure.

8. A stepping actuator according to claim 1, wherein the drive actuator comprises a plurality of drive shuttle parts of which at least two are attached to opposite sides of the geometrical structure.

9. A stepping actuator according to claim 1, wherein the at least two latch actuators each comprise at least one latch.

10. A stepping actuator according to claim 1, wherein the at least two latch actuators each comprise a plurality of latches.

11. A stepping actuator according to claim 1, wherein the at least two latch actuators each comprise a plurality of latches of which at least two are located at substantially opposite sides of the first or second shuttle arm.

12. A stepping actuator according to claim 1, wherein at least one of the at least two latch actuators is operative to latch the first shuttle arm upon applying a first latch voltage and at least one of the at least two latch actuators is operative to latch the second shuttle arm upon applying a second latch voltage.

13. A stepping actuator according to claim 1, wherein the operating voltages are lower than 10V.

14. A stepping actuator according to claim 1, wherein the geometrical structure is an elastic structure.

15. A method for forming a stepping actuator, the method comprising:
   providing a movable body comprising a geometrical structure having attached at opposite sides thereto a first shuttle arm having a first longitudinal direction and a second shuttle arm having a second longitudinal direction,
   providing at least one drive actuator co-operative with the geometrical structure to drive the stepping actuator, and
   providing at least two latch actuators operative to latch the stepping actuator, a first of the latch actuators being co-operative with the first shuttle arm and a second of the latch actuators being co-operative with the second shuttle arm,
   wherein the geometrical structure comprises
      at least two drive springs between the shuttle arms and the at least one drive actuator such that the geometrical structure comprises at least three rigid parts at the location of the two shuttle arms and the at least one drive actuator, and such that the total length of the drive springs in the first direction is larger than the total height of the drive springs in the second direction, and
   has a displacement magnification ratio of between 0.15 and 2 at operating voltages of 15V or lower, the displacement magnification ratio being defined as the ratio of a displacement of the movable body in a first direction substantially parallel to the longitudinal direction of the first shuttle arm to a deformation of the geometrical structure causing the displacement of the movable body and being directed in a second direction substantially perpendicular to the first direction.

16. A method according to claim 15, wherein the geometrical structure is a hexagonal structure.

17. A method according to claim 16, the displacement magnification ratio of the hexagonal structure being defined as wherein the displacement magnification ratio of the hexagonal structure is defined as $\Delta x/\Delta y = 2 \tan \theta$, wherein $\Delta x$ is the displacement of the movable body in the first direction, $\Delta y$ is the deformation of the geometrical structure in the second direction, and $\theta$ is defined as the angle between an imaginary line in the longitudinal direction of the first shuttle arm, extending from the first shuttle arm in a sense away from a free extremity thereof and a drive spring of the geometrical structure, the drive spring being attached to the first shuttle arm, wherein $\theta$ is between 5° and 45°.

18. A method according to claim 15 wherein providing at least one drive actuator comprises providing at least one drive shuttle part.

19. A method according to claim 15, wherein providing at least one drive actuator comprises providing at least one drive shuttle part and attaching the at least one drive shuttle part to the geometrical structure.

20. A method according to claim 15, wherein providing at least one drive actuator comprises providing a plurality of drive shuttle parts of which at least two are attached to opposite sides of the geometrical structure.

21. A method according to claim 15, wherein providing at least two latch actuators, comprises providing at least one latch for each latch actuator.

22. A method according to claim 15, wherein providing at least two latch actuators comprises providing a plurality of latches for each latch actuator.

23. A method according to claim 15, wherein providing at least two latch actuators comprises providing a plurality of latches for each latch actuator of which at least two are located at substantially opposite sides of the first or second shuttle arm.

24. A method according to claim 15, wherein the geometrical structure, the first and second shuttle arms and the drive and latch actuators are provided by using Silicon on Insulator Multi User MEMS Processes.

\* \* \* \* \*